United States Patent
Park et al.

(10) Patent No.: US 11,445,490 B2
(45) Date of Patent: Sep. 13, 2022

(54) CONTROL RESOURCE SET DETERMINATION FOR MULTIPLE TRANSMISSION-RECEPTION POINT CONFIGURATIONS

(71) Applicant: QUALCOMM Incorporated, San Diego, CA (US)

(72) Inventors: Sungwoo Park, San Diego, CA (US); Tao Luo, San Diego, CA (US); Mostafa Khoshnevisan, San Diego, CA (US); Xiaoxia Zhang, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 16/816,413

(22) Filed: Mar. 12, 2020

(65) Prior Publication Data

US 2020/0344729 A1 Oct. 29, 2020

Related U.S. Application Data

(60) Provisional application No. 62/840,118, filed on Apr. 29, 2019.

(51) Int. Cl.
*H04W 72/04* (2009.01)

(52) U.S. Cl.
CPC .................. *H04W 72/042* (2013.01)

(58) Field of Classification Search
CPC ........... H04W 72/1273; H04W 72/042; H04W 72/0493; H04W 76/28; H04W 76/27; H04W 40/36

See application file for complete search history.

(56) References Cited

U.S. PATENT DOCUMENTS

2018/0332515 A1* 11/2018 Au ................. H04W 40/36
2020/0195410 A1* 6/2020 Li ................. H04W 76/28
(Continued)

OTHER PUBLICATIONS

ASUSTEK: "Enhancements on Multiple TRP or Panel Transmission," 3GPP Draft, 3GPP TSG RAN WG1 #96, R1-1903046, Enhancements on Multiple TRP or Panel Transmission, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 15, 2019 (Feb. 15, 2019), XP051600742, 6 pages, Retrieved from the Internet: URL:http://www.3gpp.org/ftp/tsg%5Fran/WG1%5FRL1/TSGR1%5F96/Docs/R1%2D1903046%2Ezip [retrieved on Feb. 15, 2019] section 2.2, Proposal 3<span id="_wysihtml5-undo" class="_wysihtml5-temp">.

(Continued)

*Primary Examiner* — Chi Ho A Lee

(57) ABSTRACT

The described techniques provide for efficiently monitoring for control information from a single transmission-reception point (TRP) after transitioning from a multi-TRP operation mode to a single-TRP operation mode. If a user equipment (UE) is communicating with a first TRP and a second TRP in a multi-TRP operation mode, and the UE is directed to transition to communicating with the first TRP in a single-TRP operation mode, the UE may limit the number of CORESETs monitored in the single-TRP operation mode to a maximum number of CORESETs configured for the single-TRP operation mode. That is, if the number of CORESETs monitored by the UE for control information from the first TRP in the multi-TRP mode exceeds the maximum number of CORESETs configured for the single-TRP operation mode, the UE may identify a subset of the CORESETs to monitor for control information from the first TRP in the single-TRP mode.

30 Claims, 20 Drawing Sheets

(56) References Cited

U.S. PATENT DOCUMENTS

| | | | |
|---|---|---|---|
| 2020/0351892 A1* | 11/2020 | Yi | H04L 5/0092 |
| 2021/0045119 A1* | 2/2021 | Song | H04W 72/1273 |
| 2021/0084669 A1* | 3/2021 | Mondal | H04W 72/042 |
| 2021/0112529 A1* | 4/2021 | Jassal | H04W 76/27 |
| 2021/0143889 A1* | 5/2021 | Akoum | H04W 72/042 |
| 2021/0143936 A1* | 5/2021 | Zhang | H04L 5/0023 |
| 2021/0144808 A1* | 5/2021 | Zhang | H04W 52/0274 |
| 2021/0184733 A1* | 6/2021 | Cao | H04W 72/0493 |
| 2021/0280409 A1* | 9/2021 | Yamashita | H01L 21/02337 |
| 2021/0297196 A1* | 9/2021 | Jiang | H04L 1/1854 |

OTHER PUBLICATIONS

Huawei, et al., "Enhancements on Multi-TRP/panel Transmission," 3GPP Draft, 3GPP TSG RAN WG1 Meeting #96bis, R1-1905523, Enhancements on Multi-TRP/panel Transmission Final, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Apr. 3, 2019 (Apr. 3, 2019), XP051707587, 22 pages, Retrieved from the Internet: URL:http://www.3gpp.org/ftp/tsg%5Fran/WG1%5FRL1/TSGR1%5F96b/Docs/R1%2D1905523%2Ezip [retrieved on Apr. 3, 2019] section 2 section 2.1.1.

Huawei, et al., "Summary of AI: 7.2.8.2 Enhancements on Multi-TRP/Panel Transmission of Offline Discussion," 3GPP Draft, 3GPP TSG RAN WG1 Meeting #96bis, R1-190ABCD FL_Summary Multi-TRP V2, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Apr. 9, 2019 (Apr. 9, 2019), XP051707743, 59 pages, Retrieved from the Internet: URL:http://www.3gpp.org/ftp/tsg%5Fran/WG1%5FRL1/TSGR1%5F96b/Docs/R1%2D1905684%2Ezip [retrieved on Apr. 9, 2019] section 4.1, p. 30.

International Search Report and Written Opinion—PCT/US2020/022669—ISA/EPO—datd Jul. 22, 2020 (192418WO).

VIVO: "Further Discussion on Multi-TRP Transmission," 3GPP Draft, 3GPP TSG RAN WG1 #96bis, R1-1904096, Further Discussion on Multi-TRP Transmission, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Mar. 30, 2019 (Mar. 30, 2019), 14 pages, XP051691283, Retrieved from the Internet: URL:http://www.3gpp.org/ftp/tsg%5Fran/WG1%5FRL1/TSGR1%5F96b/Docs/R1%2D1904096%2Ezip [retrieved on Mar. 30, 2019] p. 1 section 2.4.

* cited by examiner

CONTROL RESOURCE SET DETERMINATION FOR MULTIPLE TRANSMISSION-RECEPTION POINT CONFIGURATIONS

CROSS REFERENCE

The present Application for Patent claims the benefit of U.S. Provisional Patent Application No. 62/840,118 by PARK et al., entitled "CONTROL RESOURCE SET DETERMINATION FOR MULTIPLE TRANSMISSION-RECEPTION POINT CONFIGURATIONS," filed Apr. 29, 2019, assigned to the assignee hereof, and expressly incorporated by reference in its entirety herein.

BACKGROUND

The following relates generally to wireless communications and more specifically to control resource set (CORESET) determination for multiple transmission-reception point configurations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may support communications with multiple transmission-reception points (TRPs) to improve throughput or improve the reliability of communications in the wireless systems. In some cases (e.g., when data traffic projections are low and/or channel conditions are stable), the UE may transition to communicating with a single TRP in a single-TRP operation mode. Some techniques for transitioning from a multi-TRP operation mode to a single-TRP operation mode may be deficient.

SUMMARY

The described techniques relate to improved methods, systems, devices, and apparatuses that support control resource set (CORESET) determination for multiple transmission-reception point (TRP) configurations. Generally, the described techniques provide for efficiently monitoring for control information from a single TRP after transitioning from a multi-TRP operation mode to a single-TRP operation mode. If a user equipment (UE) is communicating with a first TRP and a second TRP in a multi-TRP operation mode, and the UE is directed to transition to communicating with the first TRP in a single-TRP operation mode, the UE may limit the number of CORESETs monitored in the single-TRP operation mode to a maximum number of CORESETs configured for the single-TRP operation mode. That is, if the number of CORESETs monitored by the UE for control information from the first TRP in the multi-TRP mode exceeds the maximum number of CORESETs configured for the single-TRP operation mode, the UE may identify a subset of the CORESETs to monitor for control information from the first TRP in the single-TRP mode.

A method for wireless communication at a UE is described. The method may include monitoring, in a multi-transmission-reception point operation mode, a first set of control resource sets for control information from a first transmission-reception point and a second set of control resource sets for control information from a second transmission-reception point, receiving an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmission-reception point operation mode, identifying a subset of the first set of control resource sets to monitor for control information from the first transmission-reception point in the single-transmission-reception point operation mode based on the indication, and monitoring the subset of the first set of control resource sets for control information from the first transmission-reception point in the single-transmission-reception point operation mode.

An apparatus for wireless communication at a UE is described. The apparatus may include a processor, memory in electronic communication with the processor, and instructions stored in the memory. The instructions may be executable by the processor to cause the apparatus to monitor, in a multi-transmission-reception point operation mode, a first set of control resource sets for control information from a first transmission-reception point and a second set of control resource sets for control information from a second transmission-reception point, receive an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmission-reception point operation mode, identify a subset of the first set of control resource sets to monitor for control information from the first transmission-reception point in the single-transmission-reception point operation mode based on the indication, and monitor the subset of the first set of control resource sets for control information from the first transmission-reception point in the single-transmission-reception point operation mode.

Another apparatus for wireless communication at a UE is described. The apparatus may include means for monitoring, in a multi-transmission-reception point operation mode, a first set of control resource sets for control information from a first transmission-reception point and a second set of control resource sets for control information from a second transmission-reception point, receiving an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmission-reception point operation mode, identifying a subset of the first set of control resource sets to monitor for control information from the first transmission-reception point in the single-transmission-reception point operation mode based on the indication, and monitoring the subset of the first set of control resource sets for control information from the first transmission-reception point in the single-transmission-reception point operation mode.

A non-transitory computer-readable medium storing code for wireless communication at a UE is described. The code may include instructions executable by a processor to monitor, in a multi-transmission-reception point operation mode, a first set of control resource sets for control information from a first transmission-reception point and a second set of control resource sets for control information from a second transmission-reception point, receive an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmission-reception point operation mode, identify a subset of the first set of control resource sets to monitor for control information from the first transmission-reception point in the single-transmission-reception point operation mode based on the indication, and monitor the subset of the first set of control resource sets for control information from the first transmission-reception point in the single-transmission-reception point operation mode.

In some examples of the method, apparatuses, and non-transitory computer-readable medium described herein, the indication to transition from the multi-transmission-reception point operation mode to the single-transmission-reception point operation mode includes a first indication. Some examples of the method, apparatuses, and non-transitory computer-readable medium described herein may further include operations, features, means, or instructions for receiving a second indication of the subset of the first set of control resource sets, and identifying the subset of the first set of control resource sets based on the second indication. In some examples of the method, apparatuses, and non-transitory computer-readable medium described herein, the first indication and the second indication may be received in a radio resource control message. In some examples of the method, apparatuses, and non-transitory computer-readable medium described herein, the first indication and the second indication may be received in a medium access control (MAC) control element (MAC-CE) or a downlink control information (DCI) message. In some examples of the method, apparatuses, and non-transitory computer-readable medium described herein, the single-transmission-reception point operation mode includes a temporary single-transmission-reception point operation mode in a radio resource control configured multi-transmission-reception point operation mode.

In some examples of the method, apparatuses, and non-transitory computer-readable medium described herein, receiving the second indication of the subset of the first set of control resource sets may include operations, features, means, or instructions for receiving an indication of control resource sets in the first set of control resource sets excluded from the subset of the first set of control resource sets. In some examples of the method, apparatuses, and non-transitory computer-readable medium described herein, receiving the indication of control resource sets in the first set of control resource sets excluded from the subset of the first set of control resource sets may include operations, features, means, or instructions for receiving a predefined garbage value in a transmission configuration indication field that corresponds to each of the control resource sets in the first set of control resource sets excluded from the subset of the first set of control resource sets.

In some examples of the method, apparatuses, and non-transitory computer-readable medium described herein, identifying the subset of the first set of control resource sets may include operations, features, means, or instructions for identifying the subset of the first set of control resource sets to monitor for control information from the first transmission-reception point in the single-transmission-reception point operation mode based on a predefined rule. In some examples of the method, apparatuses, and non-transitory computer-readable medium described herein, the indication to transition may be received from the first transmission-reception point, and identifying and monitoring the subset of the first set of control resource sets may include operations, features, means, or instructions for identifying and monitoring the subset of the first set of control resource sets upon receiving the indication to transition from the multi-transmission-reception point operation mode to the single-transmission-reception point operation mode.

In some examples of the method, apparatuses, and non-transitory computer-readable medium described herein, the indication to transition may be received from the second transmission-reception point, and identifying and monitoring the subset of the first set of control resource sets may include operations, features, means, or instructions for identifying and monitoring the subset of the first set of control resource sets upon receiving the indication to transition from the multi-transmission-reception point operation mode to the single-transmission-reception point operation mode or identifying and monitoring the subset of the first set of control resource sets once a configured duration of time may have expired after receiving the indication to transition from the multi-transmission-reception point.

In some examples of the method, apparatuses, and non-transitory computer-readable medium described herein, the indication to transition may be received from the second transmission-reception point, and identifying and monitoring the subset of the first set of control resource sets may include operations, features, means, or instructions for receiving a triggering signal to trigger the transition from the multi-transmission-reception point operation mode to the single-transmission-reception point operation mode, and identifying and monitoring the subset of the first set of control resource sets upon receiving the triggering signal.

In some examples of the method, apparatuses, and non-transitory computer-readable medium described herein, the predefined rule indicates that the UE may be to select the subset of the first set of control resource sets having a lowest set of indices, and identifying the subset of the first set of control resource sets based on the predefined rule may include operations, features, means, or instructions for identifying a number of control resource sets corresponding to the control resource set limit for the single-transmission-reception point operation mode, selecting the number of control resource sets having the lowest set of indices from the first set of control resource sets, and identifying the subset of the first set of control resource sets based on the selecting, where the subset of the first set of control resource sets includes the number of control resource sets having the lowest set of indices from the first set of control resource sets.

Some examples of the method, apparatuses, and non-transitory computer-readable medium described herein may further include operations, features, means, or instructions for receiving another indication to transition back from the single-transmission-reception point operation mode to the multi-transmission-reception point operation mode. In some examples of the method, apparatuses, and non-transitory computer-readable medium described herein, the indication to transition from the multi-transmission-reception point operating mode to the single-transmission-reception point operation mode may include a first indication, and the other indication to transition back from the single-transmission-reception point operation mode to the multi-transmission-reception point operation mode may include a second indication.

Some examples of the method, apparatuses, and non-transitory computer-readable medium described herein may further include operations, features, means, or instructions for receiving a third indication of the first set of control resource sets to monitor for control information from the first transmission-reception point after transitioning back to the multi-transmission-reception point operation mode. Some examples of the method, apparatuses, and non-transitory computer-readable medium described herein may further include operations, features, means, or instructions for identifying the first set of control resource sets to monitor for control information from the first transmission-reception point after transitioning back to the multi-transmission-reception point operation mode based on a predefined rule.

A method for wireless communication at a base station is described. The method may include transmitting, to a UE operating in a multi-transmission-reception point operation mode, control information on a first set of control resource sets using a first transmission-reception point and control information on a second set of control resource sets using a second transmission-reception point, identifying a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode, transmitting, to the UE, an indication for the UE to transition from the multi-transmission-reception point operation mode to the single-transmission-reception point operation mode, and transmitting, to the UE, control information on the subset of the first set of control resource sets after the UE transitions to the single-transmission-reception point.

An apparatus for wireless communication at a base station is described. The apparatus may include a processor, memory in electronic communication with the processor, and instructions stored in the memory. The instructions may be executable by the processor to cause the apparatus to transmit, to a UE operating in a multi-transmission-reception point operation mode, control information on a first set of control resource sets using a first transmission-reception point and control information on a second set of control resource sets using a second transmission-reception point, identify a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode, transmit, to the UE, an indication for the UE to transition from the multi-transmission-reception point operation mode to the single-transmission-reception point operation mode, and transmit, to the UE, control information on the subset of the first set of control resource sets after the UE transitions to the single-transmission-reception point.

Another apparatus for wireless communication at a base station is described. The apparatus may include means for transmitting, to a UE operating in a multi-transmission-reception point operation mode, control information on a first set of control resource sets using a first transmission-reception point and control information on a second set of control resource sets using a second transmission-reception point, identifying a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode, transmitting, to the UE, an indication for the UE to transition from the multi-transmission-reception point operation mode to the single-transmission-reception point operation mode, and transmitting, to the UE, control information on the subset of the first set of control resource sets after the UE transitions to the single-transmission-reception point.

A non-transitory computer-readable medium storing code for wireless communication at a base station is described. The code may include instructions executable by a processor to transmit, to a UE operating in a multi-transmission-reception point operation mode, control information on a first set of control resource sets using a first transmission-reception point and control information on a second set of control resource sets using a second transmission-reception point, identify a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode, transmit, to the UE, an indication for the UE to transition from the multi-transmission-reception point operation mode to the single-transmission-reception point operation mode, and transmit, to the UE, control information on the subset of the first set of control resource sets after the UE transitions to the single-transmission-reception point.

In some examples of the method, apparatuses, and non-transitory computer-readable medium described herein, the indication for the UE to transition from the multi-transmission-reception point operation mode to the single-transmission-reception point operation mode may include a first indication. Some examples of the method, apparatuses, and non-transitory computer-readable medium described herein may further include operations, features, means, or instructions for transmitting a second indication of the subset of the first set of control resource sets. In some examples of the method, apparatuses, and non-transitory computer-readable medium described herein, the first indication and the second indication may be transmitted in a radio resource control message. In some examples of the method, apparatuses, and non-transitory computer-readable medium described herein, the first indication and the second indication may be transmitted in a MAC-CE or a DCI message.

In some examples of the method, apparatuses, and non-transitory computer-readable medium described herein, the single-transmission-reception point operation mode includes a temporary single-transmission-reception point operation mode in a radio resource control configured multi-transmission-reception point operation mode. In some examples of the method, apparatuses, and non-transitory computer-readable medium described herein, transmitting the second indication of the subset of the first set of control resource sets may include operations, features, means, or instructions for transmitting an indication of control resource sets in the first set of control resource sets excluded from the subset of the first set of control resource sets. In some examples of the method, apparatuses, and non-transitory computer-readable medium described herein, transmitting the indication of control resource sets in the first set of control resource sets excluded from the subset of the first set of control resource sets may include operations, features, means, or instructions for transmitting a predefined garbage value in a transmission configuration indication field that corresponds to each of the control resource sets in the first set of control resource sets excluded from the subset of the first set of control resource sets.

In some examples of the method, apparatuses, and non-transitory computer-readable medium described herein, identifying the subset of the first set of control resource sets may include operations, features, means, or instructions for identifying the subset of the first set of control resource sets on which to transmit control information to the UE using the first transmission-reception point when the UE may be in the single-transmission-reception point operation mode based on a predefined rule. In some examples of the method, apparatuses, and non-transitory computer-readable medium described herein, transmitting the indication for the UE to transition from the multi-transmission-reception point operation mode to the single-transmission-reception point operation mode may include operations, features, means, or instructions for transmitting the indication for the UE to transition from the multi-transmission-reception point operation mode to the single-transmission-reception point operation mode using the first transmission-reception point or the second transmission reception point.

Some examples of the method, apparatuses, and non-transitory computer-readable medium described herein may further include operations, features, means, or instructions for transmitting the indication for the UE to transition from the multi-transmission-reception point operation mode to the single-transmission-reception point operation mode using the second transmission-reception point, and transmitting a triggering signal using the first transmission-reception point to trigger the transition from the multi-transmission-reception point operation mode to the single-transmission-reception point operation mode.

In some examples of the method, apparatuses, and non-transitory computer-readable medium described herein, the predefined rule indicates that the base station is to select the subset of the first set of control resource sets having a lowest set of indices, and identifying the subset of the first set of control resource sets based on the predefined rule may include operations, features, means, or instructions for identifying a number of control resource sets corresponding to the control resource set limit for the single-transmission-reception point operation mode, selecting the number of control resource sets having the lowest set of indices from the first set of control resource sets, and identifying the subset of the first set of control resource sets based on the selecting, where the subset of the first set of control resource sets includes the number of control resource sets having the lowest set of indices from the first set of control resource sets.

Some examples of the method, apparatuses, and non-transitory computer-readable medium described herein may further include operations, features, means, or instructions for transmitting another indication for the UE to transition back from the single-transmission-reception point operation mode to the multi-transmission-reception point operation mode. In some examples of the method, apparatuses, and non-transitory computer-readable medium described herein, the indication to transition from the multi-transmission-reception point operating mode to the single-transmission-reception point operation mode includes a first indication, and the other indication to transition back from the single-transmission-reception point operation mode to the multi-transmission-reception operation mode includes a second indication.

Some examples of the method, apparatuses, and non-transitory computer-readable medium described herein may further include operations, features, means, or instructions for transmitting a third indication of the first set of control resource sets on which to transmit control information to the UE using the first transmission-reception point after the UE transitions back to the multi-transmission-reception point operation mode. Some examples of the method, apparatuses, and non-transitory computer-readable medium described herein may further include operations, features, means, or instructions for identifying the first set of control resource sets on which to transmit control information to the UE using the first transmission-reception point after the UE transitions back to the multi-transmission-reception point operation mode based on a predefined rule.

DETAILED DESCRIPTION

Figure 1:
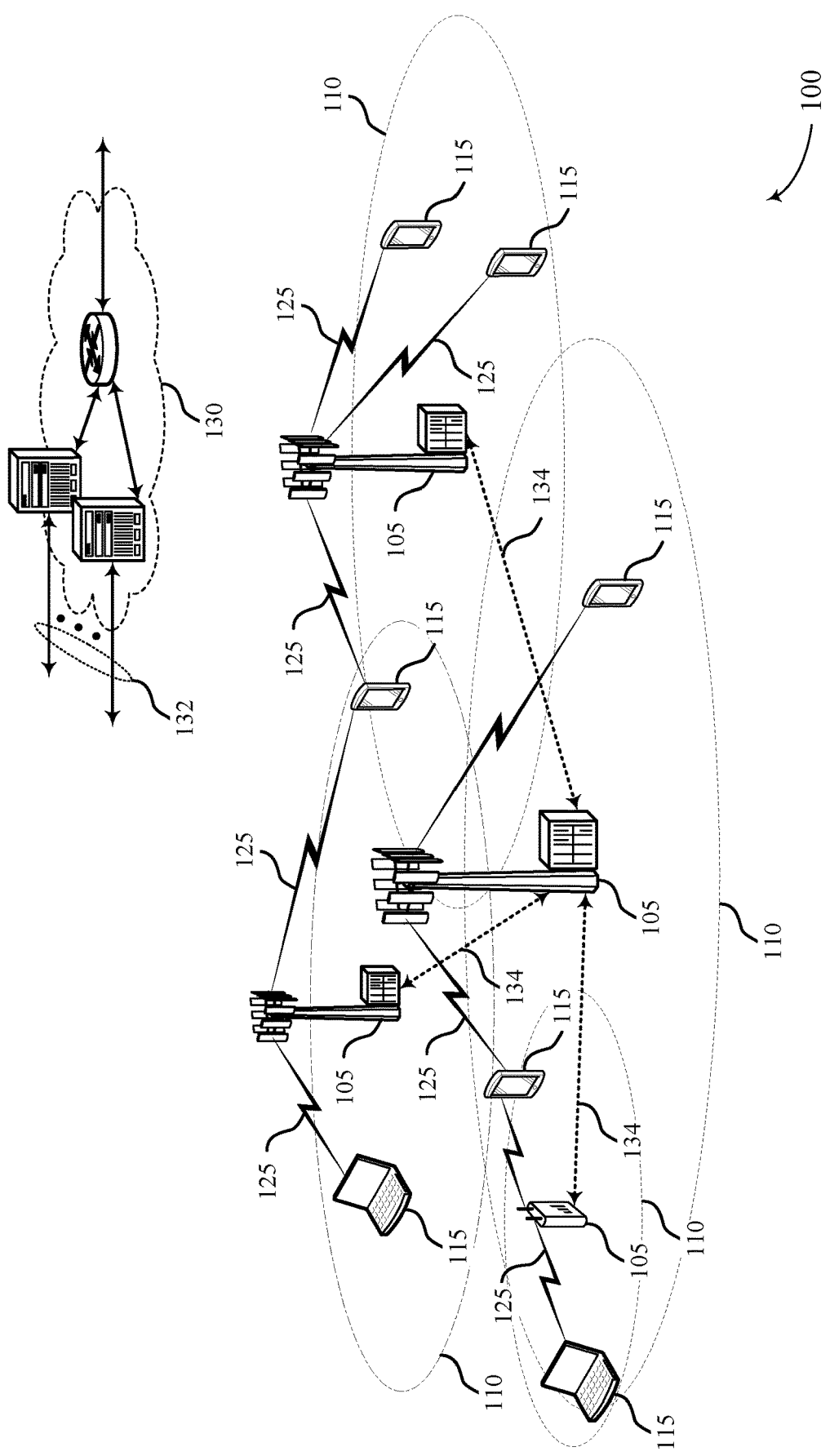
FIG. 1 illustrates an example of a wireless communications system that supports control resource set (CORESET) determination for multiple transmission-reception point (TRP) configurations in accordance with aspects of the present disclosure.

In some wireless communications systems, a UE may support communications with multiple transmission-reception points (TRPs) to improve throughput or improve the reliability of communications. For instance, when operating in a multi-TRP operation mode, the UE may simultaneously receive different downlink data from multiple TRPs, resulting in improved throughput, or the UE may receive the same downlink data from multiple TRPs, resulting in improved reliability (e.g., a higher chance that the data is received by the UE). While communications with multiple TRPs may improve throughput and reliability, such communications may also result in high power consumption at a UE (e.g., since the UE may maintain multiple beams for communicating with the multiple TRPs). Thus, in some cases (e.g., when channel conditions are stable and/or data traffic projections are low), it may be appropriate for the UE to save power by transitioning to communicating with a single TRP in a single-TRP operation mode.

For example, it may be appropriate for a UE communicating with a first TRP and a second TRP in a multi-TRP operation mode to switch to communicating with the first TRP in a single-TRP operation mode. In some systems, however, though the UE may transition from the multi-TRP operation mode to the single-TRP operation mode, the UE may be configured to monitor for control information in a same number of control resource sets (CORESETs) in the single-TRP operation mode (e.g., the same as the number of CORESETs monitored for control information from the first TRP in the multi-TRP operation mode). In such systems, if the number of CORESETs exceeds a maximum number of CORESETs configured for the single-TRP operation mode, the UE power savings associated with switching to the single-TRP operation mode may be limited (e.g., since the UE may be monitoring more CORESETs than the maximum number of CORESETs configured for the single-TRP operation mode).

As described herein, a UE may support efficient techniques for monitoring for control information from a single TRP after transitioning from a multi-TRP operation mode to a single-TRP operation mode. If a user equipment (UE) is communicating with a first TRP and a second TRP in a multi-TRP operation mode, and the UE is directed to transition to communicating with the first TRP in a single-TRP operation mode, the UE may limit the number of CORESETs monitored in the single-TRP operation mode to a maximum number of CORESETs configured for the single-TRP operation mode. That is, if the number of CORESETs monitored by the UE for control information from the first TRP in the multi-TRP mode exceeds the maximum number of CORESETs configured for the single-TRP operation mode, the UE may identify a subset of the CORESETs to monitor for control information from the first TRP in the single-TRP mode. Because the UE may limit the number of CORESETs monitored for control information in the single-TRP operation mode, the power savings associated with transitioning from a multi-TRP operation mode to a single-TRP operation mode may be improved.

Aspects of the disclosure introduced above are described below in the context of a wireless communications system. Examples of processes and signaling exchanges that support CORESET determination for multiple TRP configurations are then described. Aspects of the disclosure are further illustrated by and described with reference to apparatus diagrams, system diagrams, and flowcharts that relate to CORESET determination for multiple TRP configurations.

FIG. 1 illustrates an example of a wireless communications system 100 that supports CORESET determination for multiple TRP configurations in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in a frequency division duplexing (FDD) mode) or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. In some cases, HARQ feedback may include an acknowledgement (ACK) indicating that a transmission was successfully received and decoded or a negative ACK (NACK) indicating that a transmission was not successfully received or decoded. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some aspects, a UE 115 may support communications with a single TRP. In such aspects, the UE 115 may be configured to monitor up to three CORESETs per bandwidth part (BWP) for control information from the single TRP. A CORESET may be a set of resources (e.g., frequency and time resource) that may include control information in one or more PDCCHs. Coresets (e.g., the resources for different CORESETs) may be configured by RRC signaling with a transmission configuration indicator (TCI) state (e.g., a bit value corresponding to a transmit beam used to transmit control information in the CORESET), and a UE 115 may monitor each CORESET for PDCCH blind detection by using a receive beam corresponding to the TCI state configured with the CORESET. In some examples, the maximum number of CORESETs that a UE 115 may support (e.g., when operating in a single-TRP operation mode) may be equal to or less than three (e.g., where the exact value is included in a UE capability report transmitted by the UE 115 to a base station 105).

In some wireless systems, in addition to supporting communications with a single TRP, a UE 115 may support communications with multiple TRPs.

Figure 2:
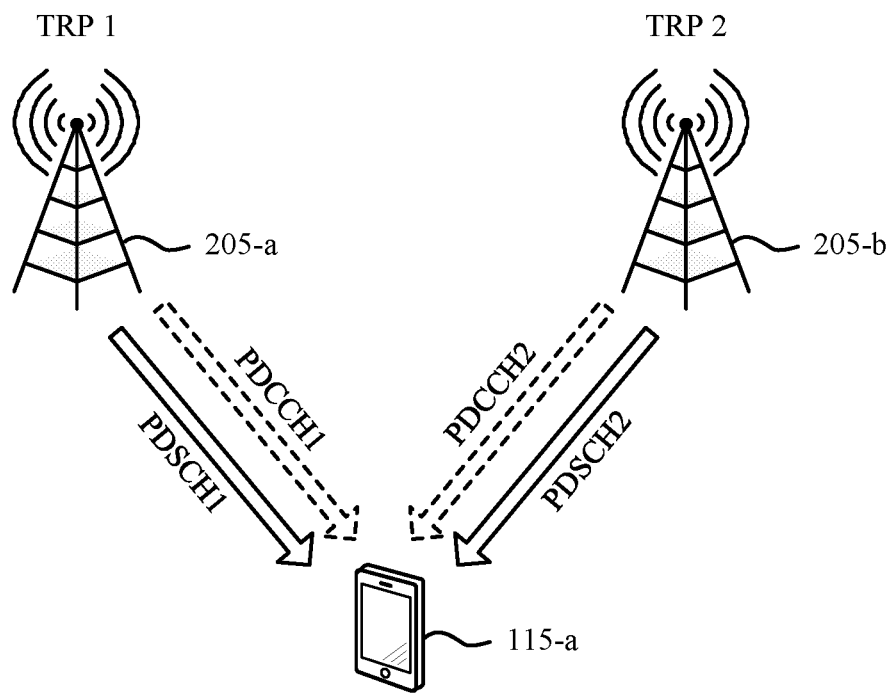
FIG. 2 illustrates an example of a wireless system that supports communications between a user equipment (UE) and multiple TRPs in accordance with aspects of the present disclosure.

FIG. 2 illustrates an example of a wireless system 200 that supports communications between a UE 115-a and multiple TRPs 205. Wireless system 200 may support multiple-PDCCH based multi-TRP or multi-panel transmission with intra-cell (e.g., where TRP 205-a and TRP 205-b are associated with a same cell ID) and inter-cell (e.g., where TRP 205-a and TRP 205-b are associated with different cell IDs). In the example of FIG. 2, UE 115-a may receive an RRC configuration from a base station 105 that may link multiple PDCCH/PDSCH pairs with multiple TRPs. In some cases, though the maximum number of CORESETs that a UE 115 may support when communicating with a single TRP may be three or less, the maximum number of CORESETs that a UE 115 may support when communicating with multiple TRPs (e.g., the maximum number of CORESETs per PDCCH-config, where each CORESET in a PDCCH-config corresponds to one TRP) may be greater than three (e.g., four, five, six). Further, as with a single TRP deployment, the maximum number of CORESETs that a UE 115 may support may be included in a UE capability report.

Figure 3:
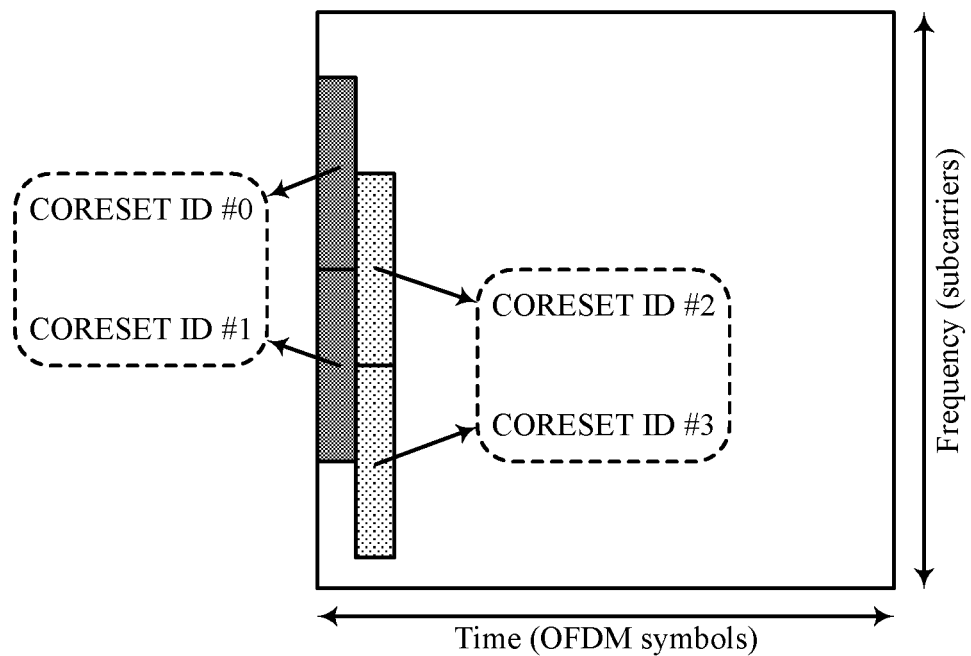
FIG. 3 illustrates an example of CORESETs monitored by a UE for control information from multiple TRPs in accordance with aspects of the present disclosure.

FIG. 3 illustrates an example of CORESETs 300 monitored by a UE 115 for control information from multiple TRPs in accordance with aspects of the present disclosure. In the example of FIG. 3, the UE 115 may monitor CORESETs 305 (e.g., with IDs #0 and #1) for control information from a first TRP and CORESETs 310 (e.g., with IDs #2 and #3) for control information from a second TRP. In other examples, the number of CORESETs assigned to each TRP may be different. For instance, six CORESETs may be distributed for two-TRP operation under the constraint of a total limit, $N_1+N_2 \leq 6$, by assigning one CORESET to the first TRP and five CORESETs to the second TRP, two CORESETs to the first TRP and four CORESETs to the second TRP, three CORESETs to the first TRP and three CORESETs to the second TRP, four CORESETs to the first TRP and two CORESETs to the second TRP, or five CORESETs to the first TRP and one CORESET to the second TRP. Alternatively, six CORESETs may be distributed for two-TRP operation under the constraint of a total limit, $N_1+N_2 \leq 6$ and a per-TRP limit, $N_1 \leq 4$ and $N_2 \leq 4$, by assigning two CORESETs to the first TRP and four CORESETs to the second TRP, three CORESETs to the first TRP and three CORESETs to the second TRP, or four CORESETs to the first TRP and two CORESETs to the second TRP.

By supporting communications with multiple TRPs, a UE 115 may be able to improve throughput and improve the reliability of communications in a wireless communications system. For instance, when operating in a multi-TRP operation mode, the UE 115 may simultaneously receive different downlink data from multiple TRPs, resulting in improved throughput, or the UE 115 may receive the same downlink data from multiple TRPs, resulting in improved reliability (e.g., a higher chance that the data is received by the UE 115). While communications with multiple TRPs may improve throughput and reliability, such communications may also result in high power consumption at a UE (e.g., since the UE may maintain multiple beams for communicating with the multiple TRPs).

Thus, in some cases (e.g., when channel conditions are stable and/or data traffic projections are low), it may be appropriate for the UE to save power by transitioning to communicating with a single TRP in a single-TRP operation mode. For example, it may be appropriate for a UE communicating with a first TRP and a second TRP in a multi-TRP operation mode to switch to communicating with the first TRP in a single-TRP operation mode.

Figure 4:
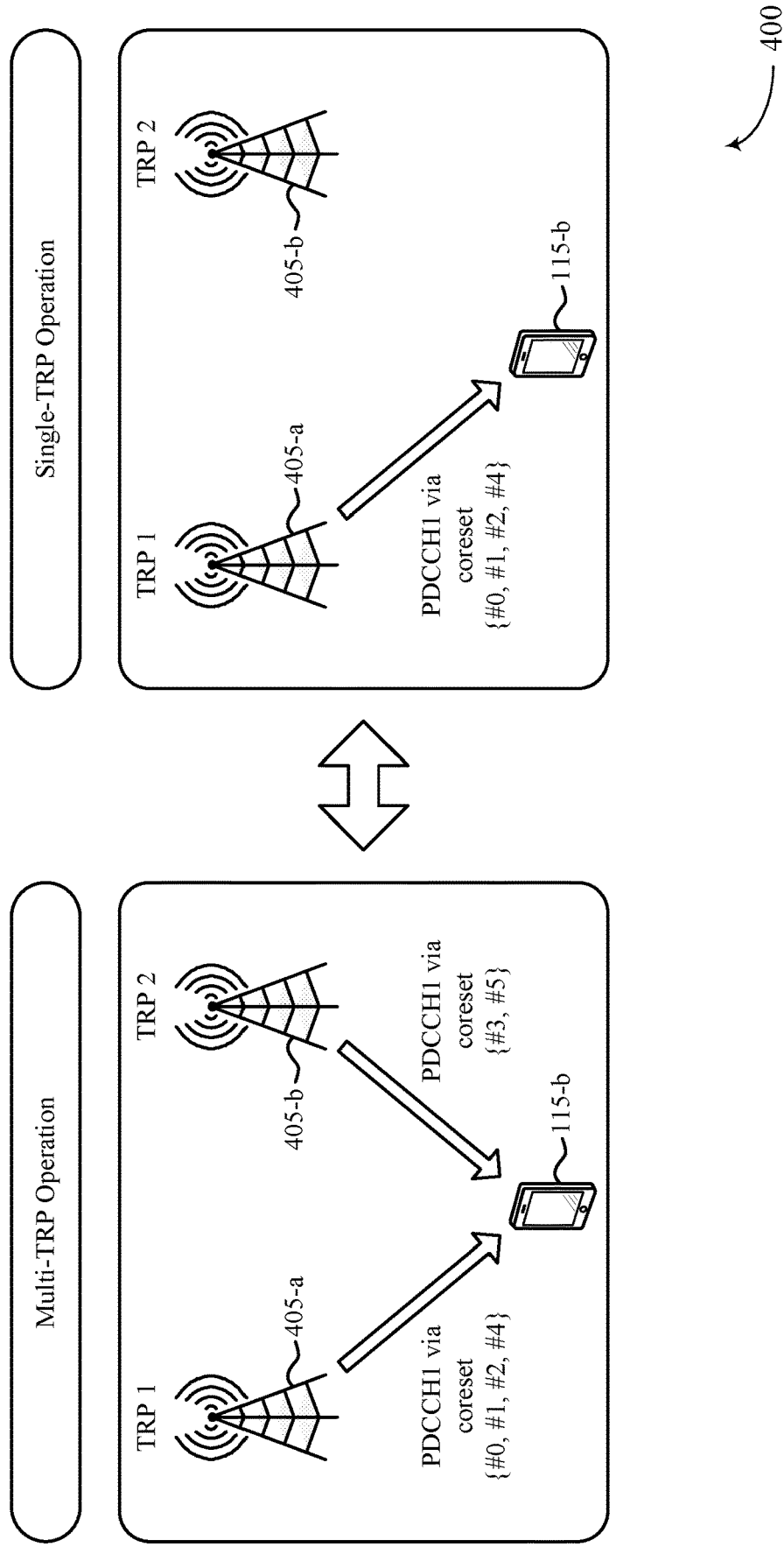
FIG. 4 illustrates an example of a multi-TRP operation mode and a single-TRP operation mode between which a UE may transition in accordance with aspects of the present disclosure.

FIG. 4 illustrates an example 400 of a multi-TRP operation mode and a single-TRP operation mode between which a UE may transition (e.g., where a multi-TRP operation mode is an operation mode in which a UE 115 may communicate with multiple TRPs and a single-TRP operation mode is an operation mode in which a UE 115 may communicate with a single TRP). In some systems, however, though the UE may transition from the multi-TRP operation mode to the single-TRP operation mode, the UE may be configured to monitor for control information in a same number of CORESETs in the single-TRP operation mode (e.g., the same as the number of CORESETs monitored for control information from the first TRP in the multi-TRP operation mode).

For instance, in the example of FIG. 4, in a multi-TRP operation mode, a UE 115 may monitor CORESETs with IDs 0, 1, 2, and 4 for control information from a first TRP 405-a, and the UE 115 may monitor CORESETs with IDs 3 and 5 for control information from a second TRP 405-b. Once the UE 115-b switches to the single-TRP operation mode, the UE 115-b may still be configured to monitor for control information from CORESETs with IDs 0, 1, 2, and 4 (as shown) despite switching to the single-TRP operation mode to save power. If the number of CORESETs exceeds a maximum number of CORESETs configured for the single-TRP operation mode (e.g., as shown in FIG. 4 for a maximum of three CORESETs configured for the single-TRP operation mode), the power savings associated with switching to the single-TRP operation mode may be limited (e.g., since the UE 115-b may be monitoring more CORESETs than the maximum number of CORESETs configured for the single-TRP operation mode). A UE 115 in wireless communications system 100 may support efficient techniques for monitoring for control information from a single TRP after transitioning from a multi-TRP operation mode to a single-TRP operation mode.

Figure 5:
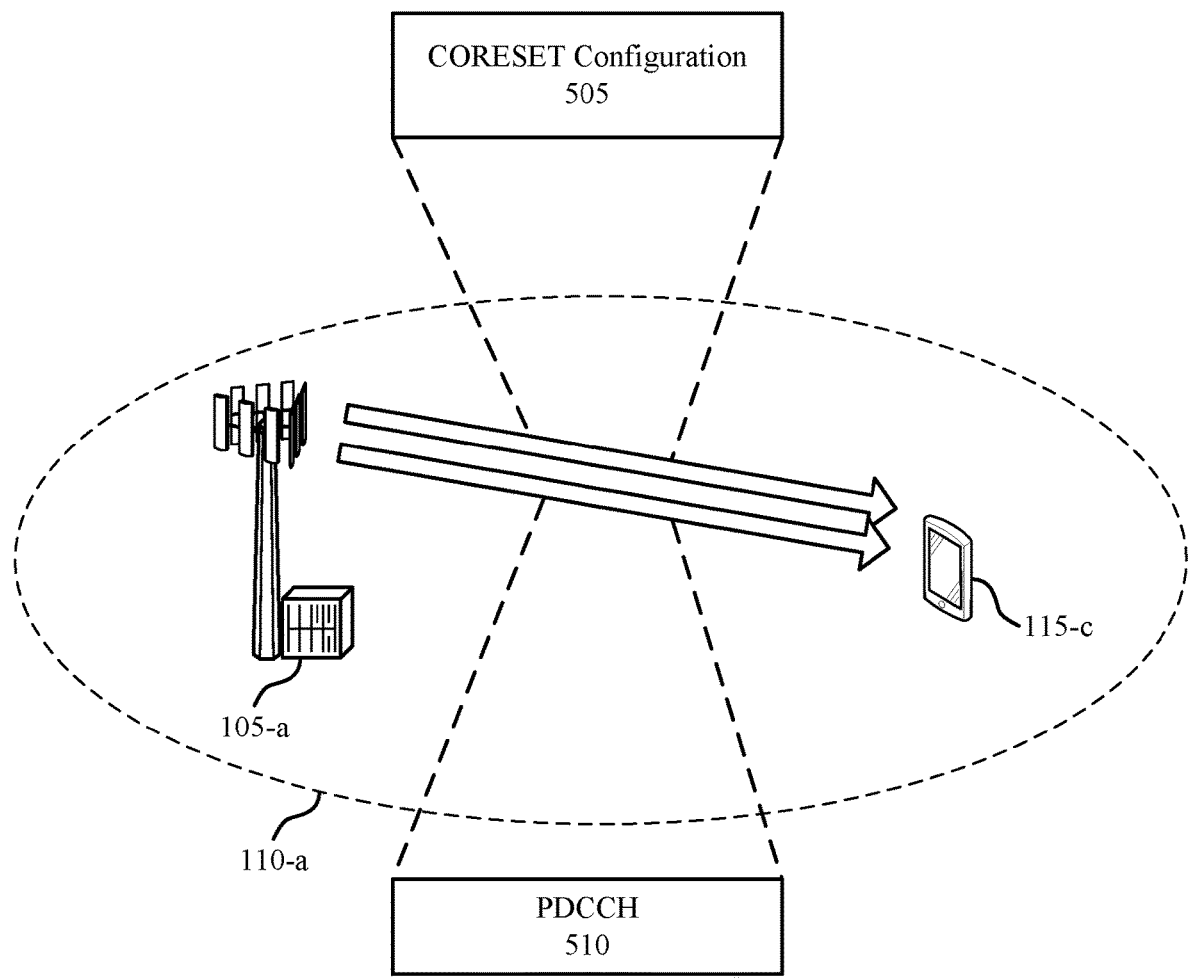
FIG. 5 illustrates an example of a wireless communications system that supports CORESET determination for multiple TRP configurations in accordance with aspects of the present disclosure.

FIG. 5 illustrates an example of a wireless communications system 500 that supports CORESET determination for multiple TRP configurations in accordance with aspects of the present disclosure. Wireless communications system 500 includes base station 105-a, which may be an example of a base station 105 described with reference to FIGS. 1-4. Wireless communications system 500 also includes UE 115-c, which may be an example of a UE 115 described with reference to FIGS. 1-4. Base station 105-a may provide communication coverage for a geographical coverage area 110-a, which may be an example of a coverage area 110 described with reference to FIG. 1. Wireless communications system 500 may implement aspects of wireless communications system 100. For instance, UE 115-c in wireless communications system 500 may support efficient techniques for monitoring for control information from a single TRP after transitioning from a multi-TRP operation mode to a single-TRP operation mode.

In the example of FIG. 5, UE 115-c may initially be configured to communicate with at least a first TRP and a second TRP in a multi-TRP operation mode. For instance, UE 115-c may receive a control message (e.g., RRC message) from base station 105-a indicating that UE 115-c is to communicate with the first TRP and the second TRP in the multi-TRP operation mode. The control message may also indicate CORESETs for the UE 115-c to monitor for control information from each TRP in the multi-TRP operation mode. Thus, UE 115-c may monitor a first set of CORESETs for control information from the first TRP and a second set of CORESETs for control information from the second TRP. In some cases, after a period of time in the multi-TRP operation mode, the UE 115-c may be directed to transition to a single-TRP operation mode to save power (e.g., if data traffic projections are low or channel conditions are good). In such cases, the UE 115-c may use the techniques described herein to limit the number of CORESETs monitored for control information from a single TRP (e.g., the first TRP) after transitioning from the multi-TRP operation mode to the single-TRP operation mode.

Specifically, if UE 115-c is communicating with a first TRP and a second TRP in a multi-TRP operation mode, and the UE 115-c is directed to transition to communicating with the first TRP in a single-TRP operation mode, the UE 115-*c* may limit the number of CORESETs monitored in the single-TRP operation mode to a maximum number of CORESETs configured for the single-TRP operation mode. That is, if the number of CORESETs monitored by the UE 115-*c* for control information from the first TRP in the multi-TRP mode exceeds the maximum number of CORESETs configured for the single-TRP operation mode, the UE 115-*c* may identify a subset of the CORESETs to monitor for control information from the first TRP in the single-TRP operation mode (e.g., a subset that includes the maximum number of CORESETs).

In some cases, UE 115-*c* may receive a CORESET configuration 505 that indicates the subset of the CORESETs for the UE 115-*c* to monitor for control information from the first TRP in the single-TRP operation mode (e.g., as described with reference to FIGS. 6-8). In other cases, UE 115-*c* may identify the subset of the CORESETs to monitor for control information from the first TRP in the single-TRP operation mode based on a predefined rule (e.g., as described with reference to FIG. 9). Once the UE 115-*c* identifies the subset of the CORESETs to monitor and transitions to the single-TRP operation mode, the UE 115-*c* may receive control information in a PDCCH 510 in any of the CORESETs in the subset of CORESETs from the first TRP in the single-TRP operation mode.

Figure 6:
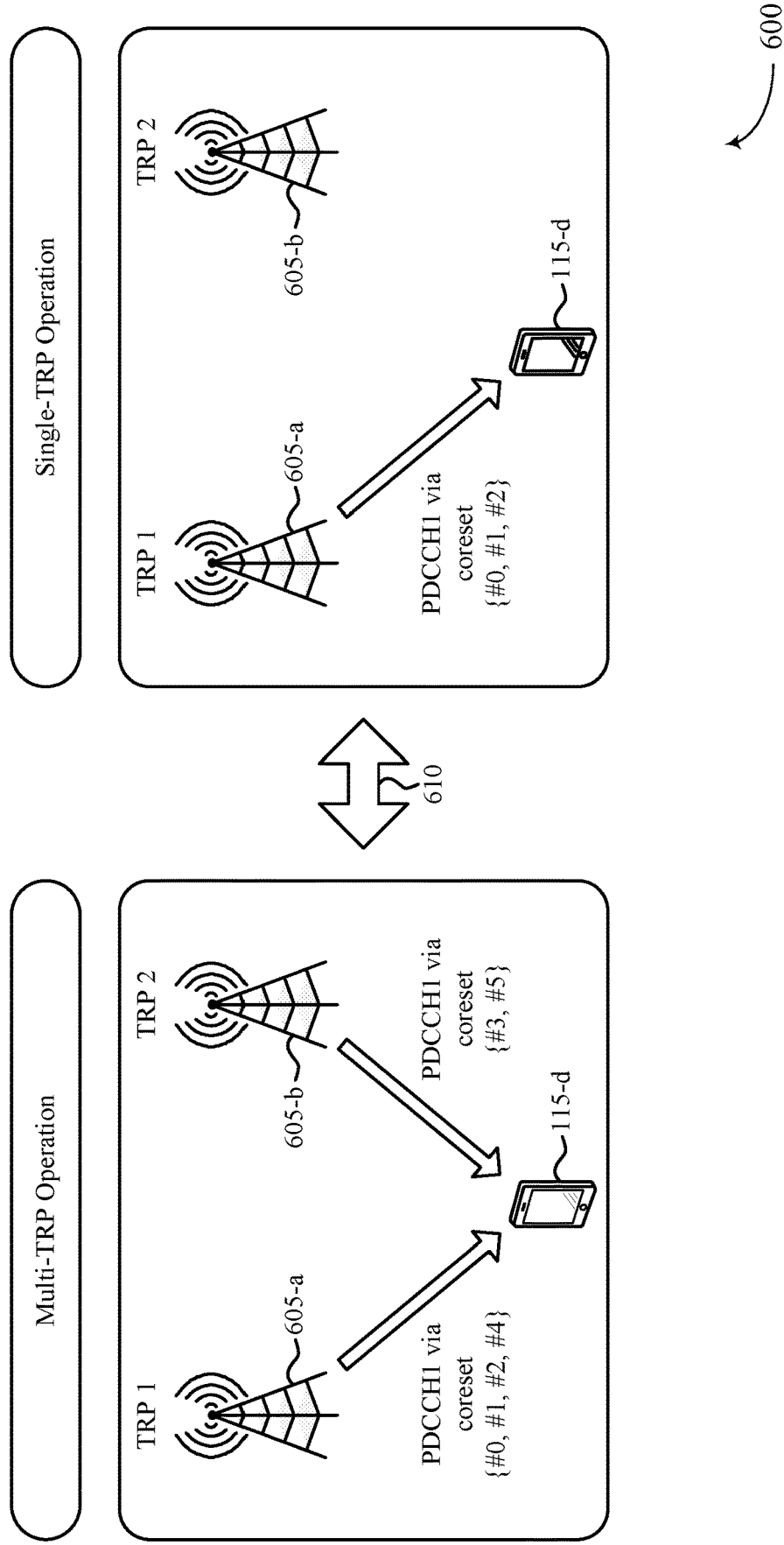
FIG. 6 illustrates an example of a multi-TRP operation mode and a single-TRP operation mode between which a UE may transition in accordance with aspects of the present disclosure.

FIG. 6 illustrates an example 600 of a multi-TRP operation mode and a single-TRP operation mode between which a UE may transition in accordance with aspects of the present disclosure. In the example of FIG. 6, UE 115-*d* may initially be configured to communicate with a first TRP 605-*a* and a second TRP 605-*b* in a multi-TRP operation mode and may monitor a first set of CORESETs with IDs 0, 1, 2, and 4 for control information from the first TRP 605-*a* and a second set of CORESETs with IDs 3 and 5 for control information from the second TRP 605-*b*. After some time, UE 115-*d* may receive an RRC message 610 indicating that UE 115-*d* is to transition from the multi-TRP operation mode to a single-TRP operation mode. As mentioned with reference to FIG. 5, the RRC message (e.g., the PDCCH-config information element in the RRC message) may also indicate (e.g., explicitly) a subset of the first set of CORESETs (e.g., M1 CORESETs, where $M_1 \leq 3$) for UE 115-*d* to monitor for control information from the first TRP 605-*a* after transitioning to the single-TRP operation mode.

Thus, UE 115-*d* may identify the subset of the first set of CORESETs (e.g., CORESETs with IDs 0, 1, and 2) to monitor for control information from the first TRP 605-*a* after transitioning to the single-TRP operation mode based on the indication in the RRC message. Since the number of CORESETs for UE 115-*d* to monitor in the single-TRP operation mode may be reduced to the maximum number of CORESETs configured for the single-TRP operation mode (or less) (e.g., compared to the example described with reference to FIG. 4, where the number of CORESETs for the UE 115-*b* to monitor may not be reduced), the UE 115-*d* may be able to improve power savings in the single-TRP operation mode. In particular, the processing power and complexity associated with monitoring CORESETs in the single-TRP operation mode may be reduced.

Figure 7:
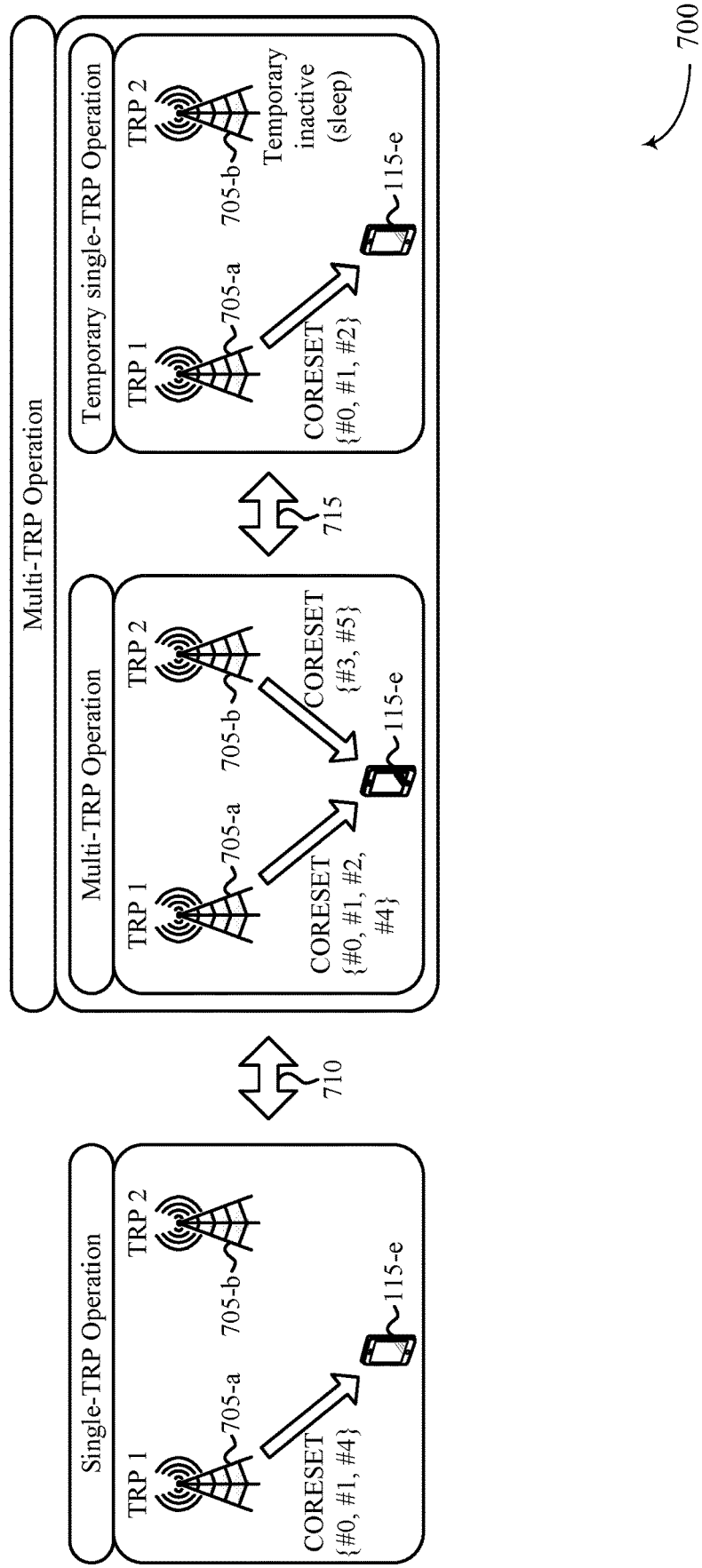
FIG. 7 illustrates an example of a multi-TRP operation mode and a single-TRP operation mode between which a UE may transition in accordance with aspects of the present disclosure.

FIG. 7 illustrates an example 700 of a multi-TRP operation mode and a single-TRP operation mode between which a UE may transition in accordance with aspects of the present disclosure. In the example of FIG. 7, UE 115-*e* may initially be configured to communicate with a first TRP 705-*a* in a single-TRP operation mode and may monitor a set of CORESETs with IDs 0, 1, and 4 for control information from the first TRP 705-*a*. The UE 115-*e* may then receive an RRC message 710 (e.g., or semi-static control message) indicating that UE 115-*e* is to transition from the single-TRP operation mode to a multi-TRP operation mode and monitor a first set of CORESETs with IDs 0, 1, 2, and 4 for control information from the first TRP 705-*a* and a second set of CORESETs with IDs 3 and 5 for control information from the second TRP 705-*b*.

After operating in the RRC configured multi-TRP operation mode, it may be appropriate for UE 115-*e* to temporarily transition to a single-TRP operation mode to save power. Accordingly, a base station 105 may transmit, and UE 115-*e* may receive, a dynamic control message 715 (e.g., downlink control information (DCI) message or MAC control element (MAC-CE)) indicating (e.g., using a go-to-sleep signal) that UE 115-*e* is to transition to a temporary single-TRP operation mode. As illustrated, the temporary single-TRP operation mode may be within the RRC configured multi-TRP operation mode, where communications with the second TRP 705-*b* may be dynamically deactivated by the dynamic control message 715 and UE 115-*e* may skip monitoring the CORESETs or PDCCHs from the second TRP 705-*b*.

As mentioned with reference to FIG. 5, the dynamic control message 715 (e.g., the DCI message or MAC-CE) may also indicate (e.g., explicitly) a subset of the first set of CORESETs (e.g., M1 CORESETs, where $M_1 \leq 3$) for UE 115-*e* to monitor for control information from the first TRP 705-*a* after transitioning to the temporary single-TRP operation mode. Thus, UE 115-*d* may identify the subset of the first set of CORESETs (e.g., CORESETs with IDs 0, 1, and 2) to monitor for control information from the first TRP 705-*a* after transitioning to the temporary single-TRP operation mode based on the indication in the dynamic control message 715. Since the number of CORESETs for UE 115-*e* to monitor in the single-TRP operation mode may be reduced to the maximum number of CORESETs configured for the single-TRP operation mode (or less), the UE 115-*d* may be able to improve power savings in the single-TRP operation mode. In particular, the processing power and complexity associated with monitoring CORESETs in the single-TRP operation mode may be reduced.

In some aspects, the first TRP 705-*a* may transmit the dynamic control message 715 to UE 115-*e*, and, in other aspects, the second TRP 705-*b* may transmit the dynamic control message 715 to UE 115-*e*. Further, in some cases, the dynamic control message 715 may indicate the specific CORESETs in the first set of CORESETs for the UE 115-*e* to monitor for control information from the first TRP 705-*a* after transitioning to the temporary single-TRP operation mode (e.g., which of the CORESETs in the first set of CORESETs are in the subset of CORESETs for the UE 115-*e* to monitor). In other cases, the dynamic control message 715 may indicate the CORESETs in the first set of CORESETs that the UE 115-*e* is to avoid monitoring for control information from the first TRP 705-*a* after transitioning to the temporary single-TRP operation mode (e.g., the dynamic control message 715 may indicate which of the CORESETs in the first set of CORESETs are excluded from the subset of CORESETs for the UE 115-*e* to monitor).

Figure 8:
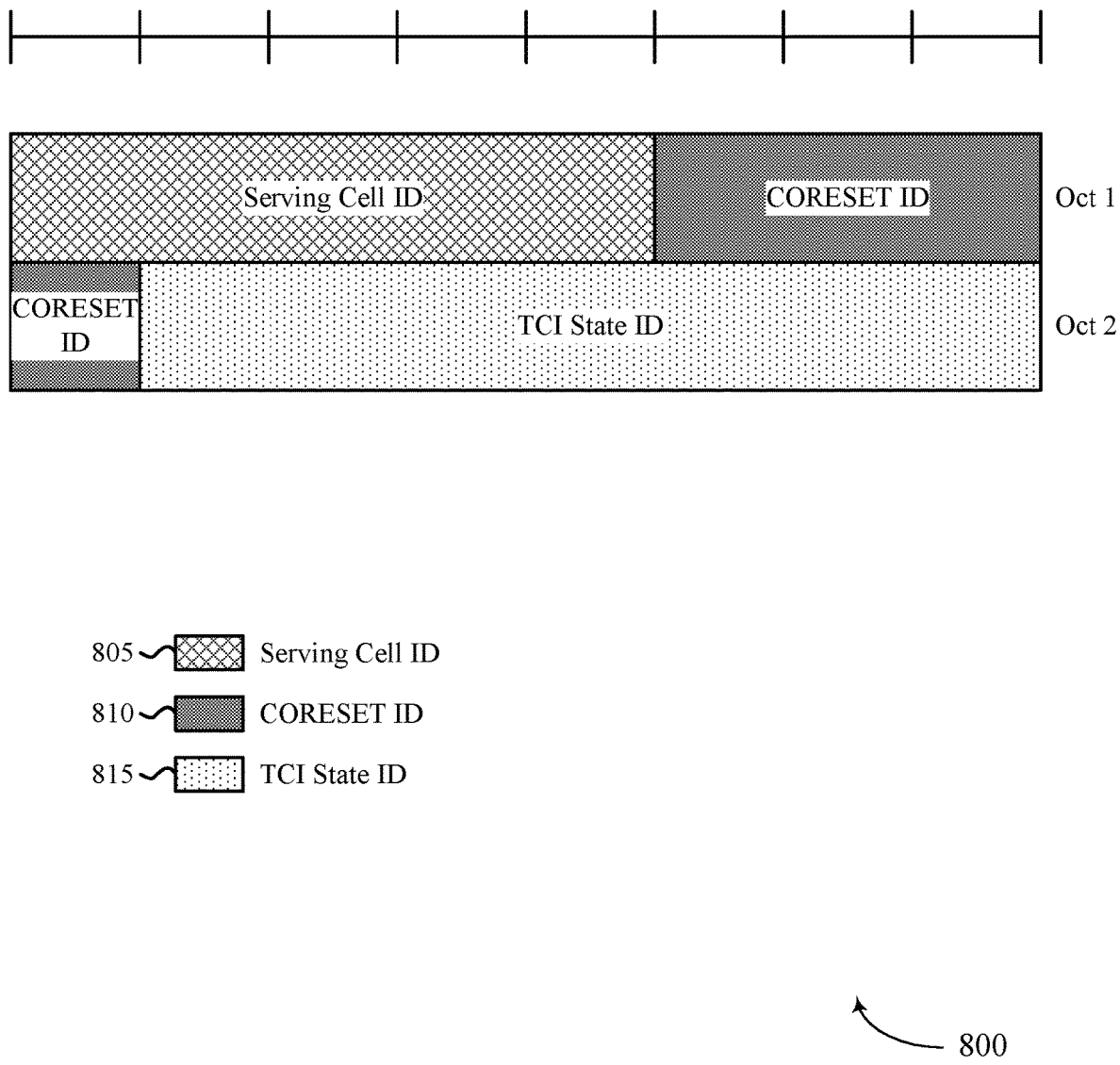
FIG. 8 illustrates an example of cases where a dynamic control message may indicate the CORESETs in a first set of CORESETs that a UE is to avoid monitoring in accordance with aspects of the present disclosure.

FIG. 8 illustrates an example of such other cases where the dynamic control message may indicate the CORESETs in the first set of CORESETs that the UE 115-*e* is to avoid monitoring. In the example of FIG. 8, the dynamic control message may be a UE-specific PDCCH MAC-CE which may deactivate other CORESETs in the first set of CORESETs that are not in the subset of CORESETs (e.g., the M_1 selected CORESETs). In particular, the dynamic control message may include a TCI state indication 800 including the serving cell ID 805 of the first TRP 705-*a*, the CORESET ID 810 of the CORESET to be excluded from the subset of CORESETs (e.g., CORESET ID #4 in the example of FIG. 7), and a predefined value (e.g., garbage value) for the TCI state ID 815 that indicates that the UE 115-*e* is to avoid monitoring the CORESET corresponding to the CORESET ID 810 for control information from the first TRP 705-*a* in the temporary single-TRP operation mode (e.g., a predefined garbage value that deactivates the CORESET with the indicated CORESET ID 810).

In the examples described with reference to FIGS. 6-8, a UE 115 may receive an explicit indication of a subset of a first set of CORESETs to monitor for control information from a first TRP after transitioning to a single-TRP operation mode. In other examples, however, a UE 115 may be configured to determine the subset of the first set of CORESETs to monitor based on a predefined rule (e.g., based on one or more static conditions). In one aspect, the predefined rule may indicate that the subset of CORESETs is to include CORESETs in the first set of CORESETs having the lowest CORESET IDs. Accordingly, the UE 115 may identify the subset of the first set of CORESETs by selecting the maximum number of CORESETs configured for the single-TRP operation mode (or less) with the lowest indices from the first set of CORESETs. In this aspect, if the first set of CORESETs includes CORESETs with IDs 0, 1, 2, and 4, and the maximum number of CORESETs configured for the single-TRP operation mode is three (e.g., $M_1$=3), the UE 115 may select the three CORESETs from the first set of CORESETs with the lowest indices to be included in the subset (e.g., CORESETs with IDs 0, 1, and 2).

In such examples where the UE 115 may identify the subset of the first set of CORESETs to monitor based on a predefined rule, it may be appropriate for the UE 115 to determine when to identify the subset of CORESETs and monitor the subset of CORESETs in the single-TRP operation mode (e.g., when to transition to the single-TRP operation mode).

Figure 9:
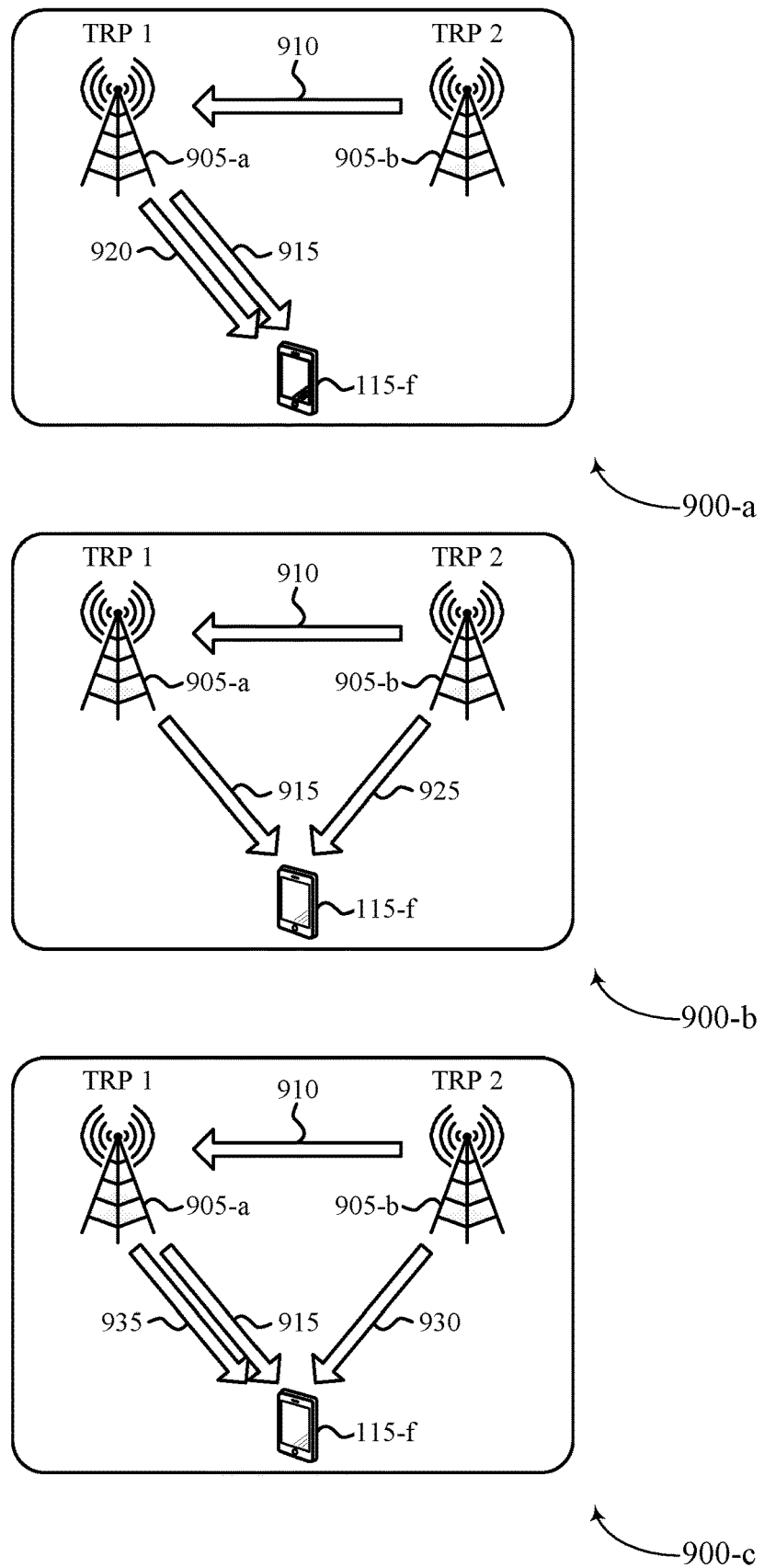
FIG. 9 illustrates examples of wireless systems that may support different techniques for indicating to a UE when the UE is to identify a subset of CORESETs and monitor the subset of CORESETs for control information from a first TRP in a single-TRP operation mode in accordance with aspects of the present disclosure.

FIG. 9 illustrates examples of wireless systems 900 that may support different techniques for indicating to a UE 115-*f* when the UE 115-*f* is to identify a subset of CORESETs and monitor the subset of CORESETs for control information from a first TRP in a single-TRP operation mode.

In example wireless system 900-*a*, TRP 905-*b* may coordinate with TRP 905-*a* via backhaul communication 910 (e.g., to indicate that TRP 905-*b* is to be deactivated), and UE 115-*f* may receive a signal 920 (e.g., a go-to-sleep signal) from TRP 905-*a* (e.g., the serving TRP 905-*a* in the single-TRP operation mode or a TRP different from the TRP 905-*b* being deactivated) indicating that UE 115-*f* is to deactivate a communication link with TRP 905-*b* (e.g., skip monitoring for PDCCHs from TRP 905-*b*), identify the subset of coresets to monitor for control information from TRP 905-*a* in the single-TRP operation mode, and monitor the subset of coresets for control information from TRP 905-*a* in the single-TRP operation mode (e.g., on communication link 915). In this example, UE 115-*f* may reduce the number of coresets (e.g., to the subset of coresets) associated with the active TRP (e.g., TRP 905-*a*) according to the predefined rule upon reception of the signal 920.

In example wireless system 900-*b*, TRP 905-*b* may coordinate with TRP 905-*a* via backhaul communication 910 (e.g., to indicate that TRP 905-*b* is to be deactivated), and UE 115-*f* may receive a signal 925 (e.g., a go-to-sleep signal) from TRP 905-*b* (e.g., the TRP being deactivated) indicating that UE 115-*f* is to deactivate a communication link with TRP 905-*b* (e.g., skip monitoring PDCCHs from TRP 905-*b*), identify the subset of coresets to monitor for control information from TRP 905-*a* in the single-TRP operation mode, and monitor the subset of coresets for control information from TRP 905-*a* in the single-TRP operation mode (e.g., on communication link 915). In this example, UE 115-*f* may reduce the number of coresets (e.g., to the subset of coresets) associated with the active TRP (e.g., TRP 905-*a*) according to the predefined rule upon reception of the signal 925 or once a threshold time has expired after receiving the signal 925 (e.g., X slots after receiving the signal 925).

In example wireless system 900-*c*, TRP 905-*b* may coordinate with TRP 905-*a* via backhaul communication 910 (e.g., to indicate that TRP 905-*b* is to be deactivated), and UE 115-*f* may receive a signal 930 (e.g., a go-to-sleep signal) from TRP 905-*b* (e.g., the TRP being deactivated) indicating that UE 115-*f* is to deactivate a communication link with TRP 905-*b* (e.g., skip monitoring PDCCHs from TRP 905-*b*). UE 115-*f* may then receive a triggering signal 935 from TRP 905-*a* indicating that UE 115-*f* is to identify the subset of coresets to monitor for control information from TRP 905-*a* in the single-TRP operation mode (e.g., on communication link 915) and monitor the subset of coresets for control information from TRP 905-*a* in the single-TRP operation mode (e.g., on communication link 915). In this example, UE 115-*f* may reduce the number of coresets (e.g., to the subset of coresets) associated with the active TRP (e.g., TRP 905-*a*) according to the predefined rule upon reception of the triggering signal 935.

Figure 10:
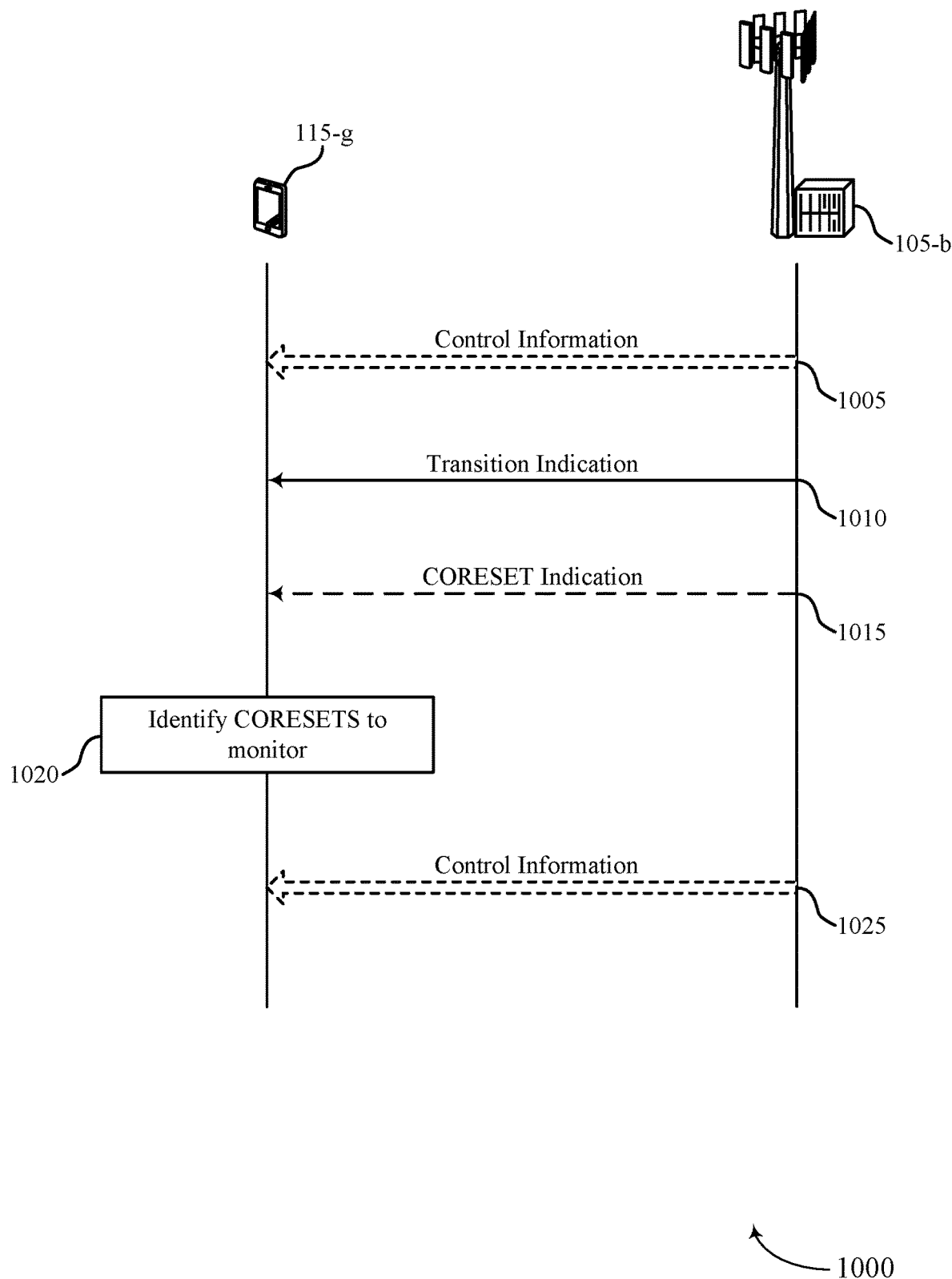
FIG. 10 illustrates an example of a process flow that supports CORESET determination for multiple TRP configurations in accordance with aspects of the present disclosure.

FIG. 10 illustrates an example of a process flow 1000 that supports CORESET determination for multiple TRP configurations in accordance with aspects of the present disclosure. Process flow 1000 illustrates aspects of techniques performed by a base station 105-*b*, which may be an example of a base station 105 described with reference to FIGS. 1-9. Process flow 1000 also illustrates aspects of techniques performed by a UE 115-*g*, which may be an example of a UE 115 described with reference to FIGS. 1-9.

At 1005, UE 115-*g* may monitor, in a multi-TRP operation mode, a first set of CORESETs for control information from a first TRP and a second set of CORESETs for control information from a second TRP. At 1010, UE 115-*g* may receive an indication to transition from the multi-TRP operation mode to a single-TRP operation mode, where the single TRP operation mode is associated with communicating with the first TRP, and where a number of CORESETs in the first set of CORESETs exceeds a CORESET limit for the single-TRP operation mode. Because the number of CORESETs in the first set of CORESETs exceeds the CORESET limit for the single-TRP operation mode, it may be appropriate for UE 115-*g* to select a subset of the first set of CORESETs to monitor for control information from the first TRP in the single-TRP operation mode.

Thus, in some implementations, at 1015, UE 115-*g* may receive an indication of the subset of the first set of CORESETs to monitor for control information from the first TRP in the single-TRP operation mode, and, at 1020, UE 115-*g* may identify the subset of the first set of CORESETs to monitor for control information from the first TRP in the single-TRP operation mode based on the indication. In one example, the indication of the subset may be received in a semi-static control message (e.g., a higher layer message such as an RRC message), and, in another example, the indication of the subset may be received in a dynamic control message (e.g., a DCI message or MAC-CE). In some cases, the single-TRP operation mode is a temporary single-TRP operation mode in an RRC configured multi-TRP operation mode.

Further, in some cases, the transition indication received at 1010 and the indication of the subset is the same indication (e.g., where the transition indication is implied by the indication of the subset). In some aspects, UE 115-*g* may receive an indication of the CORESETs in the first set of CORESETs that are included in the subset of CORESETs, and, in other aspects, UE 115-*g* may receive an indication of the CORESETs in the first set of CORESETs that are exclude from the subset of CORESETs. In such other aspects, UE 115-*g* may receive a predefined (e.g., configured at the UE 115-*g*) garbage value in a TCI state field that corresponds to each of the CORESETs in the first set of CORESETs excluded from the subset of CORESETs.

In other implementations, rather than identifying the subset of the first set of CORESETs to monitor for control information from the first TRP in the single-TRP operation mode based on a received CORESET indication, at 1020, UE 115-*g* may identify the subset of CORESETs based on a predefined rule. In one example, the predefined rule may indicate that UE 115-*g* is to select the subset of the first set of CORESETs having a lowest set of indices. Accordingly, UE 115-*g* may identify a number of CORESETs corresponding to the CORESET limit for the single-TRP operation mode, select the number of CORESETs having the lowest set of indices from the first set of CORESETs, and identify the subset of the first set of CORESETs based on the selecting, where the subset of the first set of CORESETs includes the number of CORESETs having the lowest set of indices from the first set of CORESETs.

In such other implementations, UE 115-*g* may support one or more techniques for determining when to identify and monitor the subset of the first set of CORESETs. In one example, UE 115-*g* may identify and monitor the subset of the first set of CORESETs upon receiving the indication to transition from the multi-TRP operation mode to the single-TRP operation mode, where the indication to transition is received from the first TRP. In another example, UE 115-*g* may identify and monitor the subset of the first set of CORESETs upon receiving the indication to transition from the multi-TRP operation mode to the single-TRP operation mode or once a configured duration of time has expired after receiving the indication to transition from the multi-TRP operation mode to the single-TRP operation mode, where the indication to transition is received from the second TRP. In yet another example, UE 115-*g* may receive a triggering signal to trigger the transition from the multi-TRP operation mode to the single-TRP operation mode, and UE 115-*g* may identify and monitor the subset of the first set of CORESETs upon receiving the triggering signal, where the indication to transition is received from the second TRP.

Once UE 115-*g* identifies the subset of the first set of CORESETs, at 1025, UE 115-*g* may monitor the subset of the first set of CORESETs for control information from the first TRP in the single-TRP operation mode. Although the examples described herein relate to transitioning from a multi-TRP operation mode to a single-TRP operation mode, similar techniques may be used when transitioning from a single-TRP operation mode to a multi-TRP operation mode or when transitioning from communicating with any number of TRPs to communicating with any other number of TRPs. As an example, UE 115-*g* may receive another indication to transition back from the single-TRP operation mode to the multi-TRP operation mode. In this example, UE 115-*g* may receive another indication (e.g., in an RRC message, DCI message, or MAC-CE) of the first set of CORESETs (or another set of CORESETs) to monitor for control information from the first TRP after transitioning back to the multi-TRP operation mode. Alternatively, UE 115-*g* may identify the first set of CORESETs (or another set of CORESETs) to monitor for control information from the first TRP after transitioning back to the multi-TRP operation mode based on a predefined rule.

Figure 11:
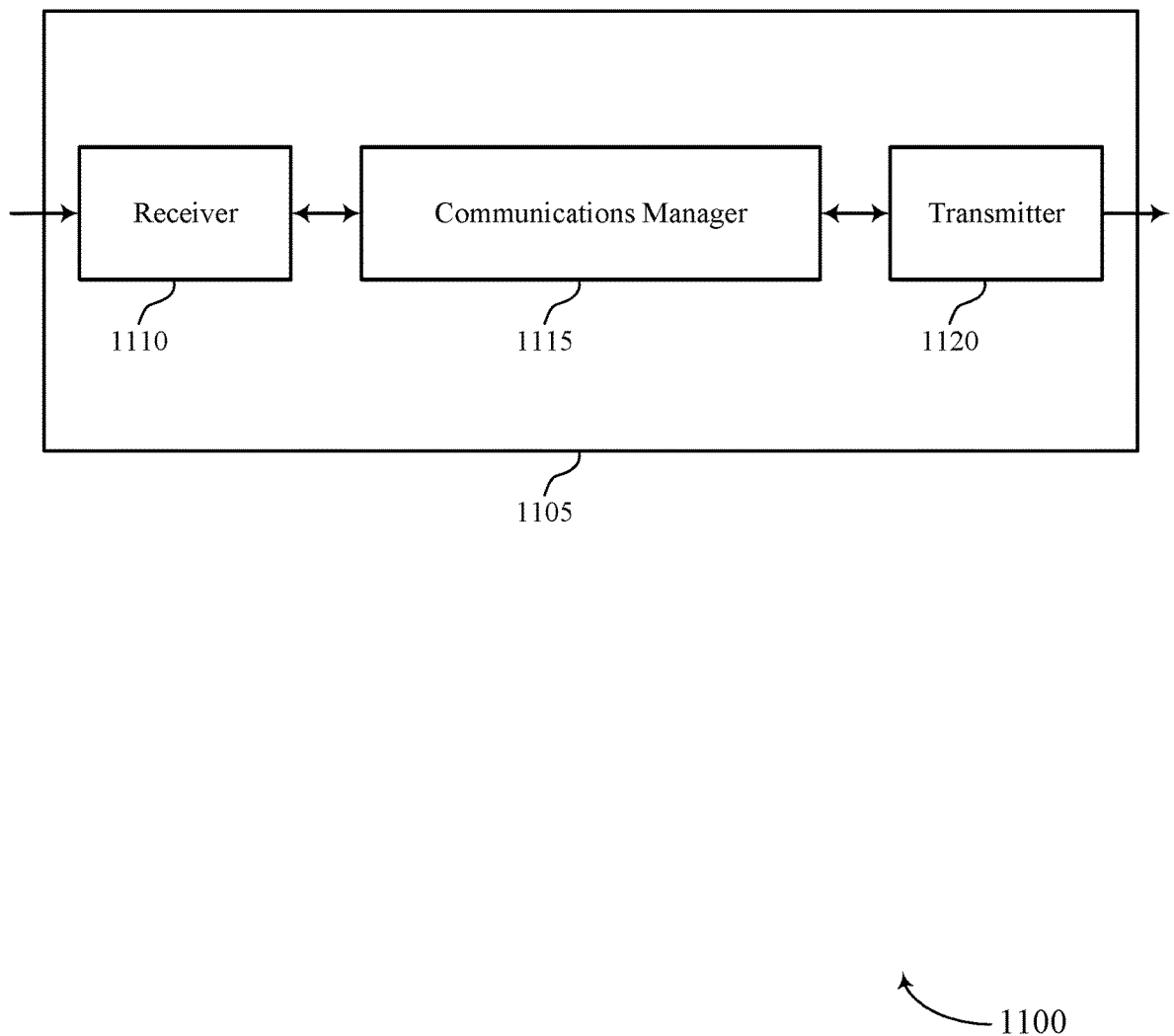
FIGS. 11 and 12 show block diagrams of devices that support CORESET determination for multiple TRP configurations in accordance with aspects of the present disclosure.

FIG. 11 shows a block diagram 1100 of a device 1105 that supports CORESET determination for multiple TRP configurations in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to CORESET determination for multiple TRP configurations). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may monitor, in a multi-transmission-reception point operation mode, a first set of control resource sets for control information from a first transmission-reception point and a second set of control resource sets for control information from a second transmission-reception point, receive an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmission-reception point operation mode, identify a subset of the first set of control resource sets to monitor for control information from the first transmission-reception point in the single-transmission-reception point operation mode based on the indication, and monitor the subset of the first set of control resource sets for control information from the first transmission-reception point in the single-transmission-reception point operation mode. The actions performed by the communications manager 815 as described herein may be implemented to realize one or more potential advantages. One implementation may allow a UE 115 to decrease power consumption by switching to a single-TRP mode and communicating with a single TRP. Additionally or alternatively, the UE 115 may further decrease power consumption by monitoring a subset of control resource sets for control information from the TRP in the single-transmission-reception point operation mode. Another implementation may provide improved quality and reliability of service at the UE 115, as latency and the number of separate resources allocated to the UE 115 may be reduced. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
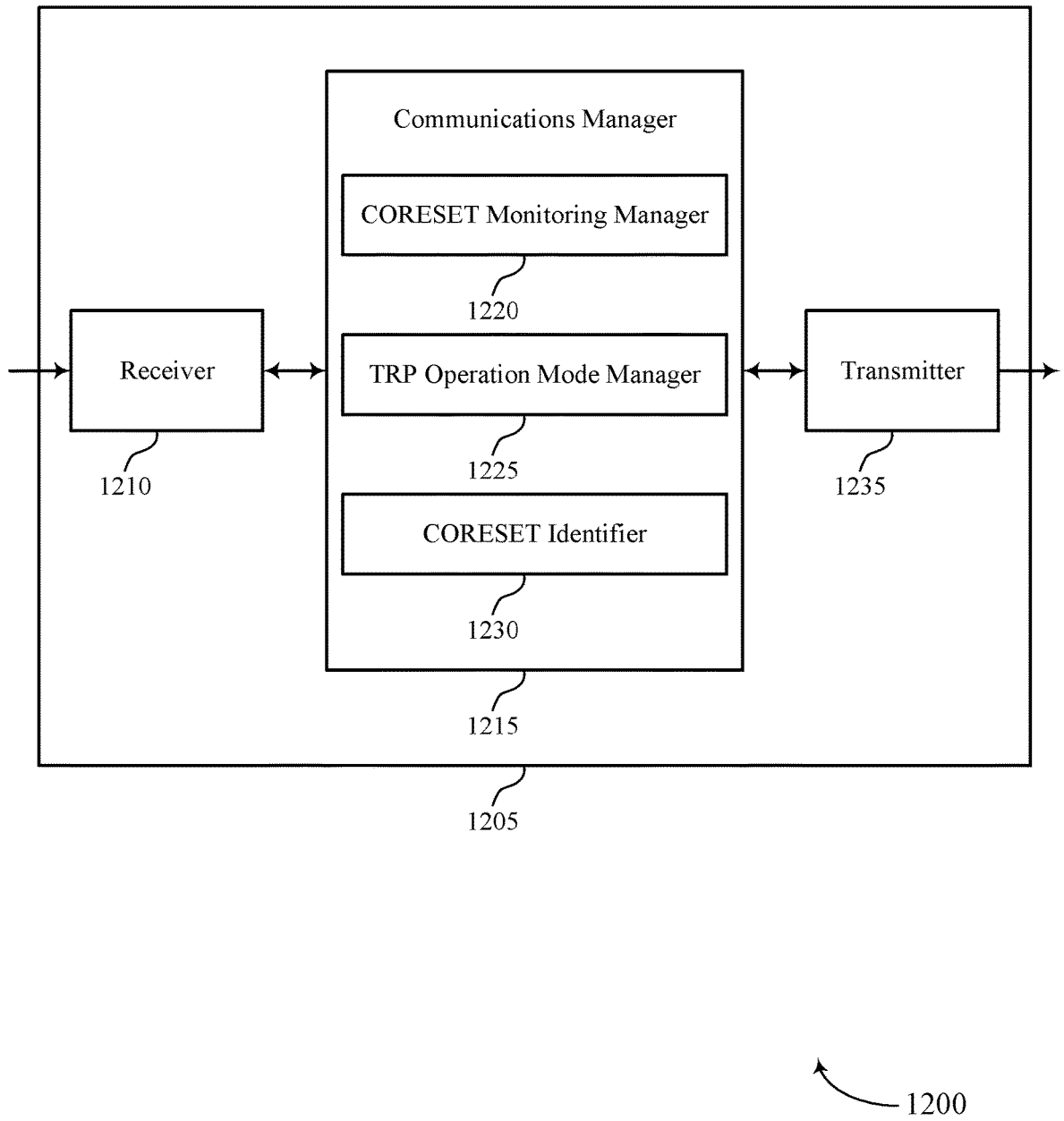

FIG. 12 shows a block diagram 1200 of a device 1205 that supports CORESET determination for multiple TRP configurations in accordance with aspects of the present disclosure. The device 1205 may be an example of aspects of a device 1105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to CORESET determination for multiple TRP configurations). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a CORESET monitoring manager 1220, a TRP operation mode manager 1225, and a CORESET identifier 1230. The communications manager 1215 may be an example of aspects of the communications manager 1410 described herein.

The CORESET monitoring manager 1220 may monitor, in a multi-transmission-reception point operation mode, a first set of control resource sets for control information from a first transmission-reception point and a second set of control resource sets for control information from a second transmission-reception point. The TRP operation mode manager 1225 may receive an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmission-reception point operation mode. The CORESET identifier 1230 may identify a subset of the first set of control resource sets to monitor for control information from the first transmission-reception point in the single-transmission-reception point operation mode based on the indication. The CORESET monitoring manager 1220 may monitor the subset of the first set of control resource sets for control information from the first transmission-reception point in the single-transmission-reception point operation mode. Based on monitoring the subset of the first set of control resource sets for control information from the first transmission-reception point in the single-transmission-reception point operation mode, a processor of a UE 115 (e.g., controlling the receiver 1110, the transmitter 1140, or the transceiver 1120 as described with reference to FIG. 11) may efficiently receive a second indication of the subset of the first set of control resource sets. Further, the processor of UE 115 may identify the subset of the first set of control resource sets based at least in part on the second indication. The processor of the UE 115 may turn on one or more processing units for identifying the subset of the first set of control resource sets, increase a processing clock, or a similar mechanism within the UE 115. As such, when the subset is identified, the processor may be ready to respond more efficiently through the reduction of a ramp up in processing power.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
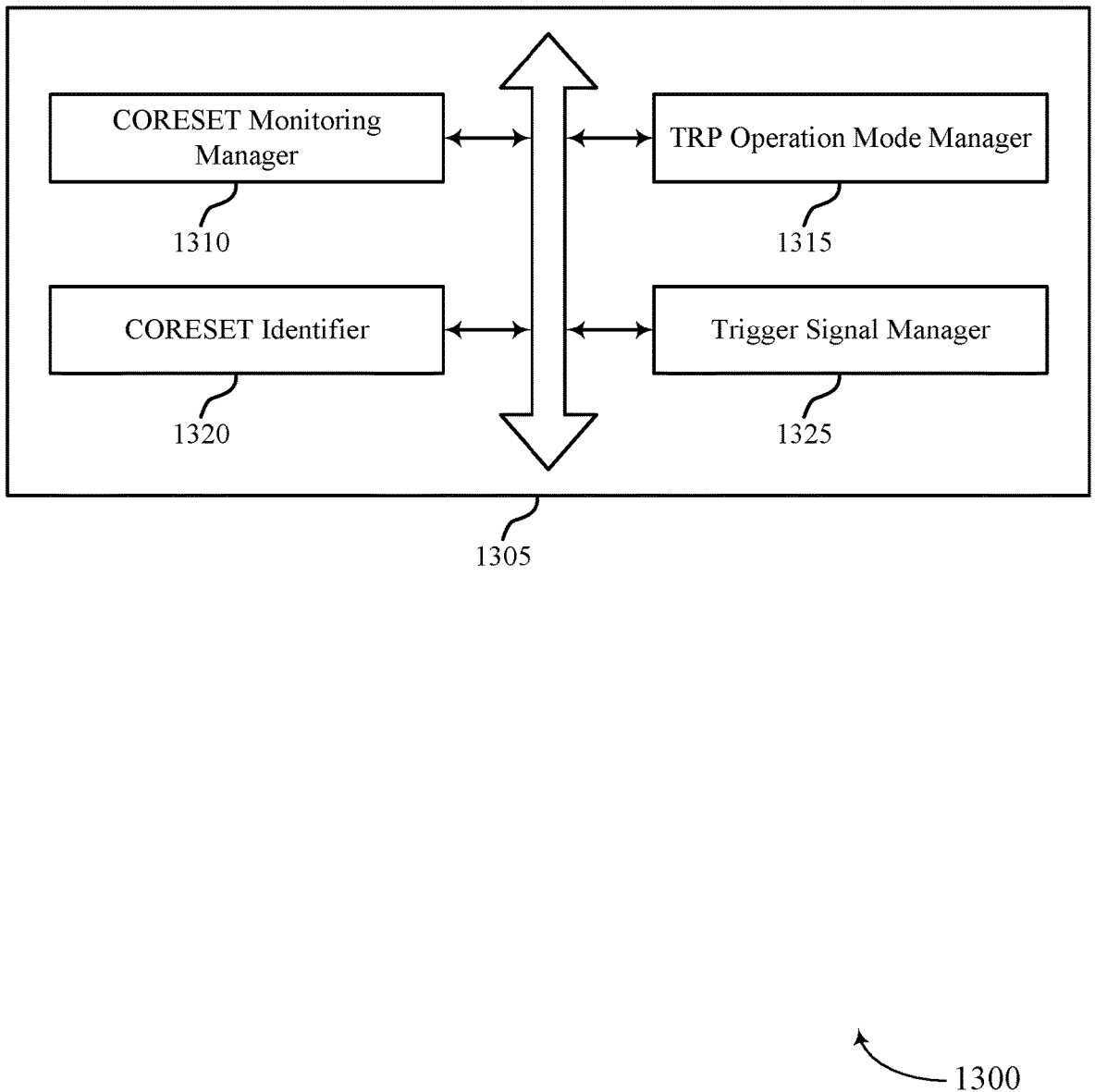
FIG. 13 shows a block diagram of a communications manager that supports CORESET determination for multiple TRP configurations in accordance with aspects of the present disclosure.

FIG. 13 shows a block diagram 1300 of a communications manager 1305 that supports CORESET determination for multiple TRP configurations in accordance with aspects of the present disclosure. The communications manager 1305 may be an example of aspects of a communications manager 1115, a communications manager 1215, or a communications manager 1410 described herein. The communications manager 1305 may include a CORESET monitoring manager 1310, a TRP operation mode manager 1315, a CORESET identifier 1320, and a trigger signal manager 1325. Each of these modules may communicate, directly or indirectly, with one another (e.g., via one or more buses).

The CORESET monitoring manager 1310 may monitor, in a multi-transmission-reception point operation mode, a first set of control resource sets for control information from a first transmission-reception point and a second set of control resource sets for control information from a second transmission-reception point. In some examples, the CORESET monitoring manager 1310 may monitor the subset of the first set of control resource sets for control information from the first transmission-reception point in the single-transmission-reception point operation mode. In some examples, the CORESET monitoring manager 1310 may identify and monitor the subset of the first set of control resource sets upon receiving the indication to transition from the multi-transmission-reception point operation mode to the single-transmission-reception point operation mode.

In some examples, the CORESET monitoring manager 1310 may identify and monitor the subset of the first set of control resource sets upon receiving the indication to transition from the multi-transmission-reception point operation mode to the single-transmission-reception point operation mode or identify and monitor the subset of the first set of control resource sets once a configured duration of time has expired after receiving the indication to transition from the multi-transmission-reception point. In some examples, the CORESET monitoring manager 1310 may identify and monitor the subset of the first set of control resource sets upon receiving the triggering signal.

The TRP operation mode manager 1315 may receive an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmission-reception point operation mode. In some examples, the TRP operation mode manager 1315 may receive another indication to transition back from the single-transmission-reception point operation mode to the multi-transmission-reception point operation mode.

The CORESET identifier 1320 may identify a subset of the first set of control resource sets to monitor for control information from the first transmission-reception point in the single-transmission-reception point operation mode based on the indication. In some examples, the CORESET identifier 1320 may receive a second indication of the subset of the first set of control resource sets. In some examples, the CORESET identifier 1320 may identify the subset of the first set of control resource sets based on the second indication. In some examples, the CORESET identifier 1320 may receive an indication of control resource sets in the first set of control resource sets excluded from the subset of the first set of control resource sets. In some examples, the CORESET identifier 1320 may receive a predefined garbage value in a transmission configuration indication field that corresponds to each of the control resource sets in the first set of control resource sets excluded from the subset of the first set of control resource sets.

In some examples, the CORESET identifier 1320 may identify the subset of the first set of control resource sets to monitor for control information from the first transmission-reception point in the single-transmission-reception point operation mode based on a predefined rule. In some examples, the CORESET identifier 1320 may identify a number of control resource sets corresponding to the control resource set limit for the single-transmission-reception point operation mode. In some examples, the CORESET identifier 1320 may select the number of control resource sets having the lowest set of indices from the first set of control resource sets. In some examples, the CORESET identifier 1320 may identify the subset of the first set of control resource sets based on the selecting, where the subset of the first set of control resource sets includes the number of control resource sets having the lowest set of indices from the first set of control resource sets.

In some examples, the CORESET identifier 1320 may receive a third indication of the first set of control resource sets to monitor for control information from the first transmission-reception point after transitioning back to the multi-transmission-reception point operation mode. In some examples, the CORESET identifier 1320 may identify the first set of control resource sets to monitor for control information from the first transmission-reception point after transitioning back to the multi-transmission-reception point operation mode based on a predefined rule. In some cases, the first indication and the second indication are received in a radio resource control message. In some cases, the first indication and the second indication are received in a MAC-CE or a DCI message. In some cases, the single-transmission-reception point operation mode includes a temporary single-transmission-reception point operation mode in a radio resource control configured multi-transmission-reception point operation mode. The trigger signal manager 1325 may receive a triggering signal to trigger the transition from the multi-transmission-reception point operation mode to the single-transmission-reception point operation mode.

Figure 14:
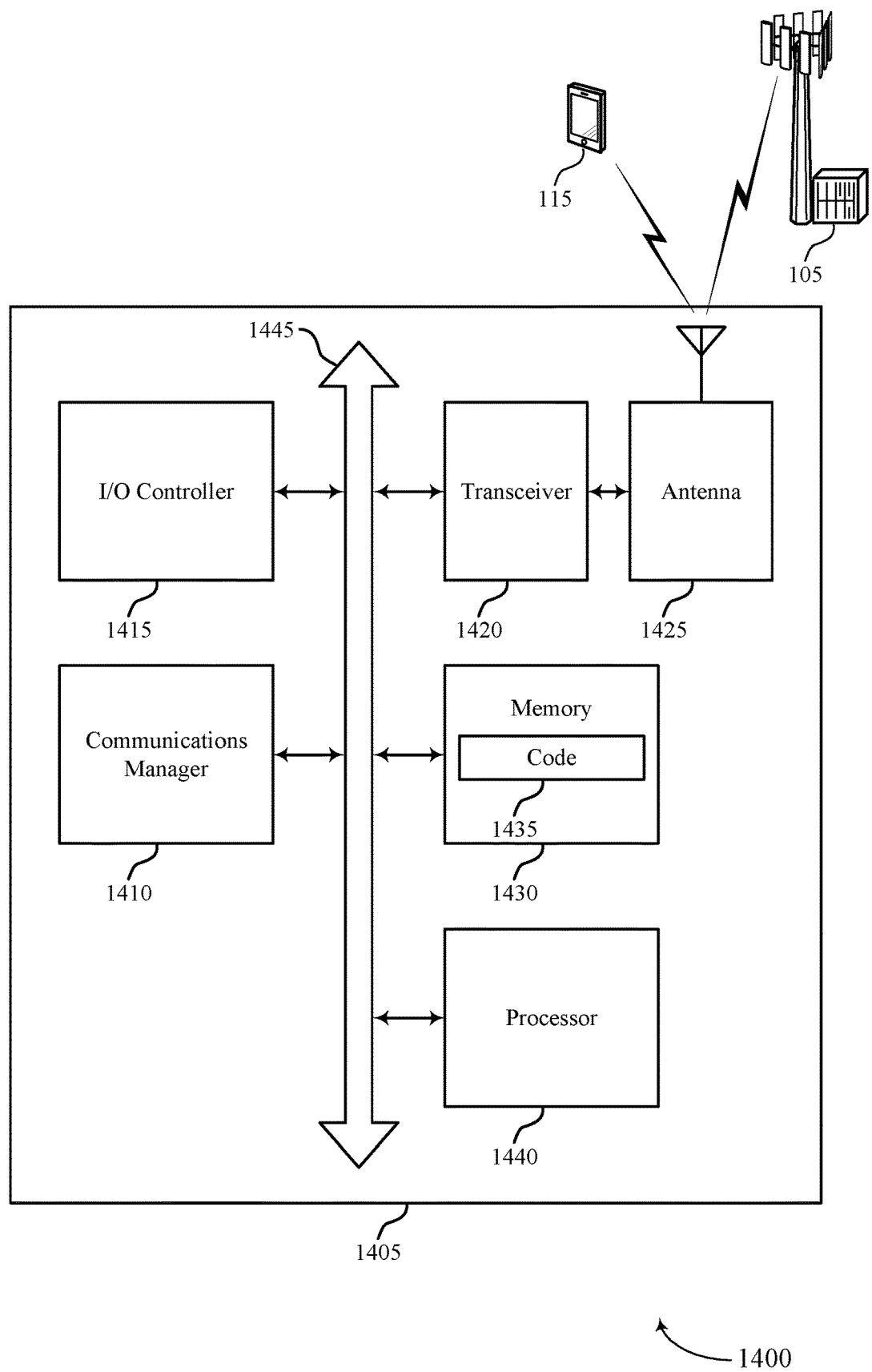
FIG. 14 shows a diagram of a system including a device that supports CORESET determination for multiple TRP configurations in accordance with aspects of the present disclosure.

FIG. 14 shows a diagram of a system 1400 including a device 1405 that supports CORESET determination for multiple TRP configurations in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may monitor, in a multi-transmission-reception point operation mode, a first set of control resource sets for control information from a first transmission-reception point and a second set of control resource sets for control information from a second transmission-reception point, receive an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmission-reception point operation mode, identify a subset of the first set of control resource sets to monitor for control information from the first transmission-reception point in the single-transmission-reception point operation mode based on the indication, and monitor the subset of the first set of control resource sets for control information from the first transmission-reception point in the single-transmission-reception point operation mode.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases, the device may have more than one antenna 1425, which may be capable of concurrently transmitting or receiving multiple wireless transmissions.

The memory 1430 may include read-only memory (RAM) and random-access memory (ROM). The memory 1430 may store computer-readable, computer-executable code 1435 including instructions that, when executed, cause the processor to perform various functions described herein. In some cases, the memory 1430 may contain, among other things, a basic input/basic output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting CORESET determination for multiple TRP configurations).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
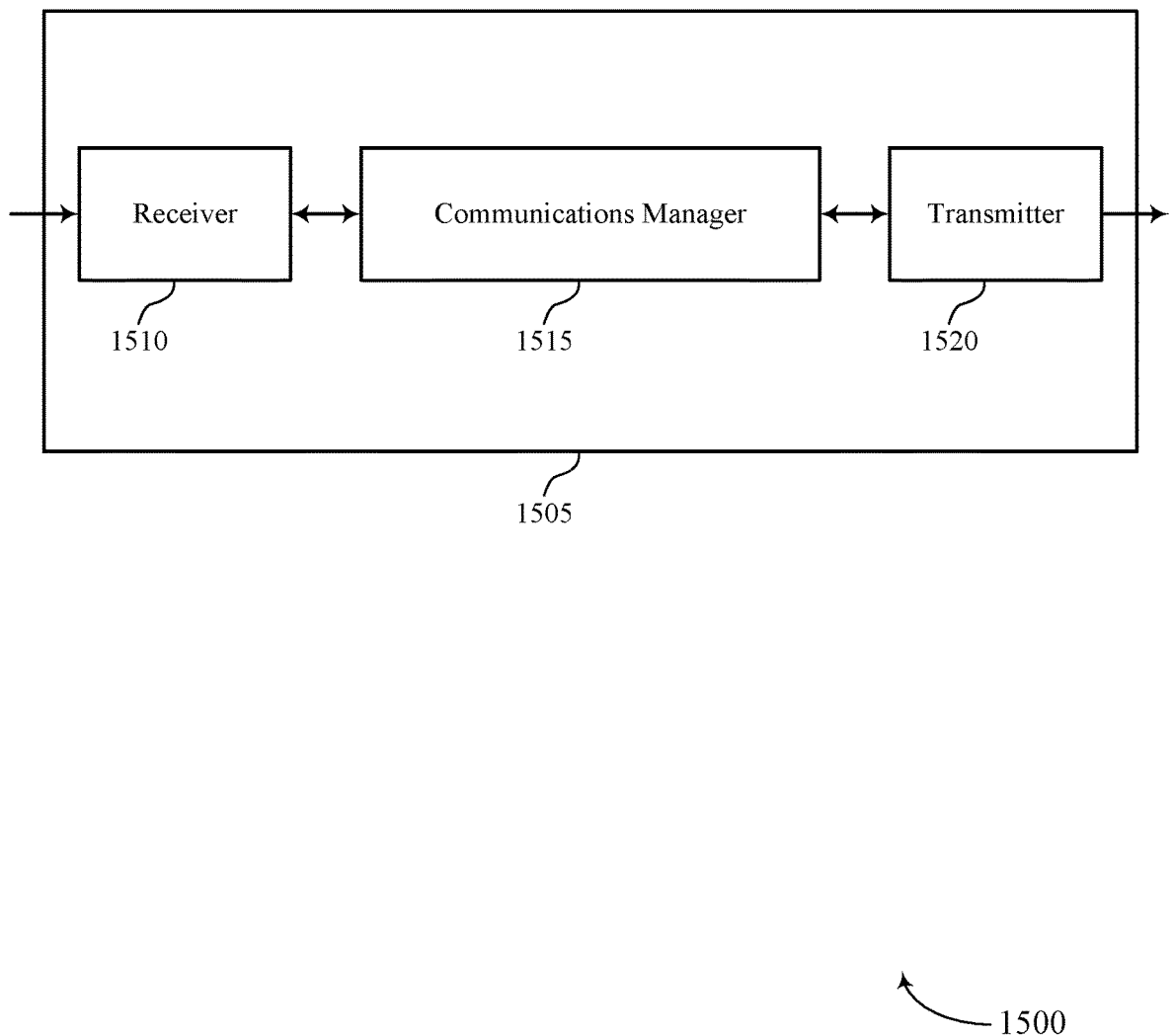
FIGS. 15 and 16 show block diagrams of devices that support CORESET determination for multiple TRP configurations in accordance with aspects of the present disclosure.

FIG. 15 shows a block diagram 1500 of a device 1505 that supports CORESET determination for multiple TRP configurations in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to CORESET determination for multiple TRP configurations). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may transmit, to a UE operating in a multi-transmission-reception point operation mode, control information on a first set of control resource sets using a first transmission-reception point and control information on a second set of control resource sets using a second transmission-reception point, identify a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode, transmit, to the UE, an indication for the UE to transition from the multi-transmission-reception point operation mode to the single-transmission-reception point operation mode, and transmit, to the UE, control information on the subset of the first set of control resource sets after the UE transitions to the single-transmission-reception point. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
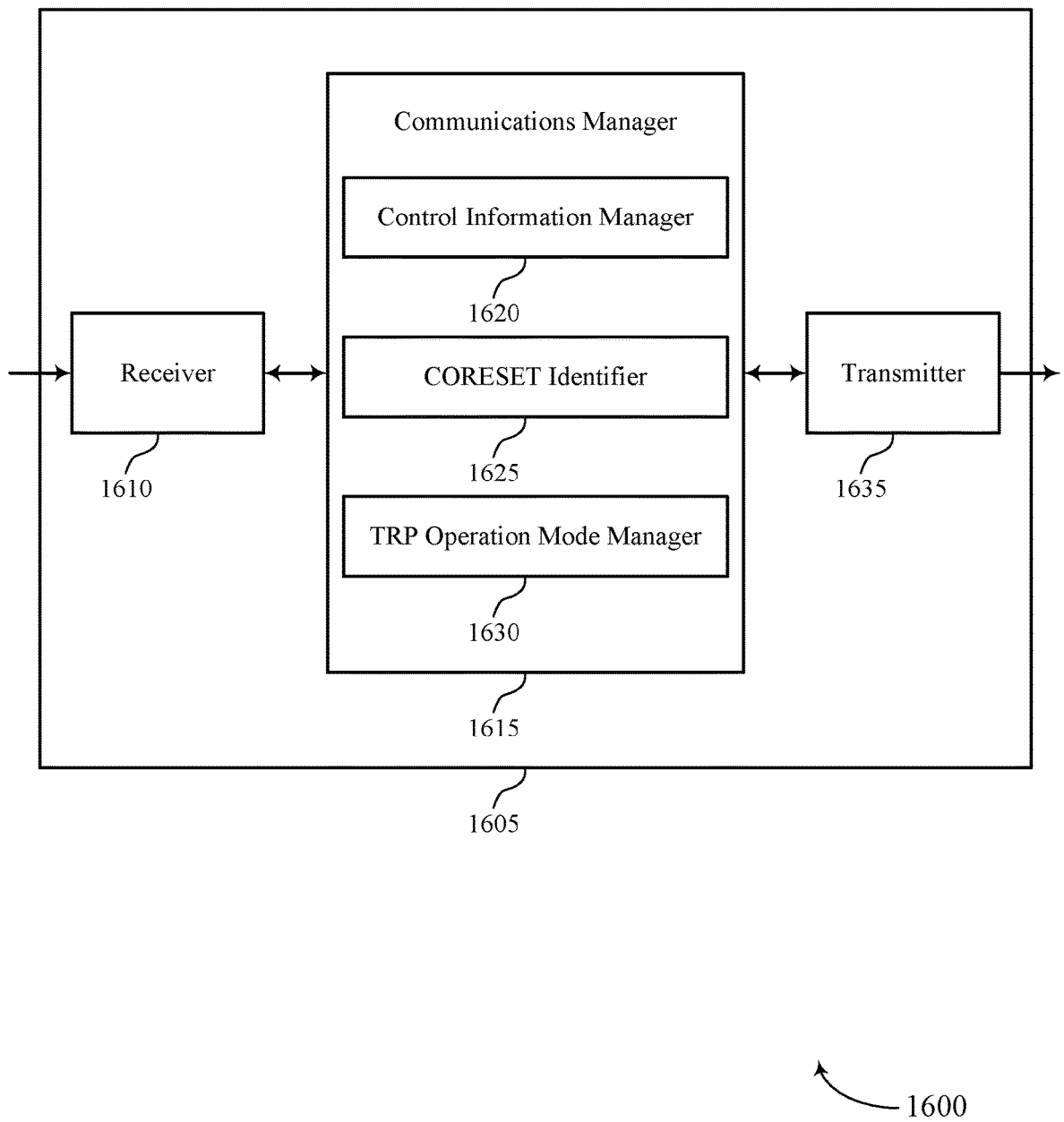

FIG. 16 shows a block diagram 1600 of a device 1605 that supports CORESET determination for multiple TRP configurations in accordance with aspects of the present disclosure. The device 1605 may be an example of aspects of a device 1505, or a base station 105 as described herein. The device 1605 may include a receiver 1610, a communications manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to CORESET determination for multiple TRP configurations). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a control information manager 1620, a CORESET identifier 1625, and a TRP operation mode manager 1630.

The communications manager 1615 may be an example of aspects of the communications manager 1810 described herein.

The control information manager 1620 may transmit, to a UE operating in a multi-transmission-reception point operation mode, control information on a first set of control resource sets using a first transmission-reception point and control information on a second set of control resource sets using a second transmission-reception point. The CORESET identifier 1625 may identify a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode. The TRP operation mode manager 1630 may transmit, to the UE, an indication for the UE to transition from the multi-transmission-reception point operation mode to the single-transmission-reception point operation mode. The control information manager 1620 may transmit, to the UE, control information on the subset of the first set of control resource sets after the UE transitions to the single-transmission-reception point.

The transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
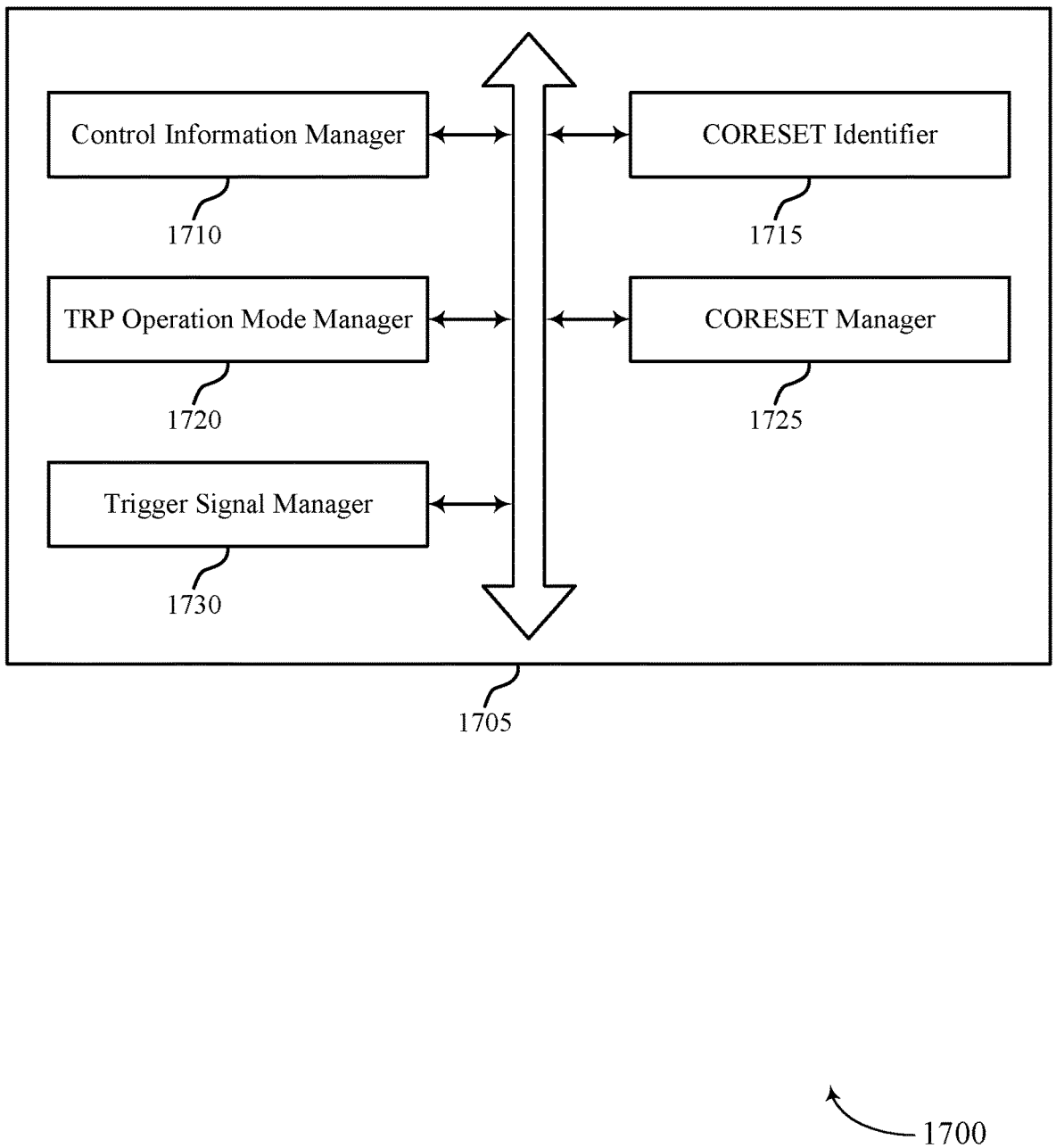
FIG. 17 shows a block diagram of a communications manager that supports CORESET determination for multiple TRP configurations in accordance with aspects of the present disclosure.

FIG. 17 shows a block diagram 1700 of a communications manager 1705 that supports CORESET determination for multiple TRP configurations in accordance with aspects of the present disclosure. The communications manager 1705 may be an example of aspects of a communications manager 1515, a communications manager 1615, or a communications manager 1810 described herein. The communications manager 1705 may include a control information manager 1710, a CORESET identifier 1715, a TRP operation mode manager 1720, a CORESET manager 1725, and a trigger signal manager 1730. Each of these modules may communicate, directly or indirectly, with one another (e.g., via one or more buses).

The control information manager 1710 may transmit, to a UE operating in a multi-transmission-reception point operation mode, control information on a first set of control resource sets using a first transmission-reception point and control information on a second set of control resource sets using a second transmission-reception point. In some examples, the control information manager 1710 may transmit, to the UE, control information on the subset of the first set of control resource sets after the UE transitions to the single-transmission-reception point. The CORESET identifier 1715 may identify a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode.

In some examples, the CORESET identifier 1715 may identify the subset of the first set of control resource sets on which to transmit control information to the UE using the first transmission-reception point when the UE is in the single-transmission-reception point operation mode based on a predefined rule. In some examples, the CORESET identifier 1715 may identify a number of control resource sets corresponding to the control resource set limit for the single-transmission-reception point operation mode. In some examples, the CORESET identifier 1715 may select the number of control resource sets having the lowest set of indices from the first set of control resource sets. In some examples, the CORESET identifier 1715 may identify the subset of the first set of control resource sets based on the selecting, where the subset of the first set of control resource sets includes the number of control resource sets having the lowest set of indices from the first set of control resource sets.

In some examples, the CORESET identifier 1715 may identify the first set of control resource sets on which to transmit control information to the UE using the first transmission-reception point after the UE transitions back to the multi-transmission-reception point operation mode based on a predefined rule. The TRP operation mode manager 1720 may transmit, to the UE, an indication for the UE to transition from the multi-transmission-reception point operation mode to the single-transmission-reception point operation mode. In some examples, the TRP operation mode manager 1720 may transmit the indication for the UE to transition from the multi-transmission-reception point operation mode to the single-transmission-reception point operation mode using the first transmission-reception point or the second transmission reception point.

In some examples, the TRP operation mode manager 1720 may transmit the indication for the UE to transition from the multi-transmission-reception point operation mode to the single-transmission-reception point operation mode using the second transmission-reception point. In some examples, the TRP operation mode manager 1720 may transmit another indication for the UE to transition back from the single-transmission-reception point operation mode to the multi-transmission-reception point operation mode. The CORESET manager 1725 may transmit a second indication of the subset of the first set of control resource sets. In some examples, the CORESET manager 1725 may transmit an indication of control resource sets in the first set of control resource sets excluded from the subset of the first set of control resource sets.

In some examples, the CORESET manager 1725 may transmit a predefined garbage value in a transmission configuration indication field that corresponds to each of the control resource sets in the first set of control resource sets excluded from the subset of the first set of control resource sets. In some examples, the CORESET manager 1725 may transmit a third indication of the first set of control resource sets on which to transmit control information to the UE using the first transmission-reception point after the UE transitions back to the multi-transmission-reception point operation mode. In some cases, the first indication and the second indication are transmitted in a radio resource control message. In some cases, the first indication and the second indication are transmitted in a MAC-CE or a DCI message. In some cases, the single-transmission-reception point operation mode includes a temporary single-transmission-reception point operation mode in a radio resource control configured multi-transmission-reception point operation mode. The trigger signal manager 1730 may transmit a triggering signal using the first transmission-reception point to trigger the transition from the multi-transmission-reception point operation mode to the single-transmission-reception point operation mode.

Figure 18:
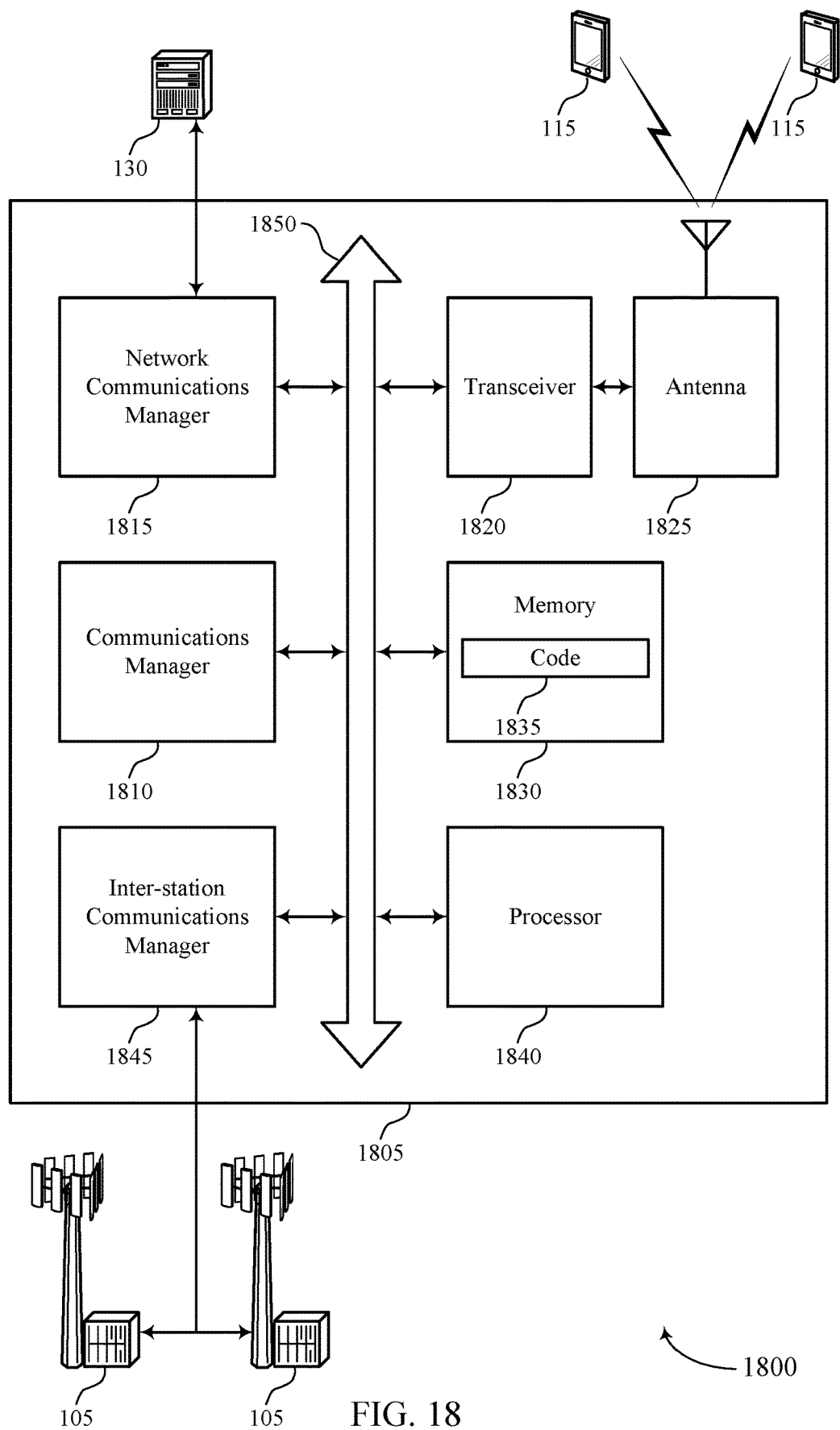
FIG. 18 shows a diagram of a system including a device that supports CORESET determination for multiple TRP configurations in accordance with aspects of the present disclosure.

FIG. 18 shows a diagram of a system 1800 including a device 1805 that supports CORESET determination for multiple TRP configurations in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may transmit, to a UE operating in a multi-transmission-reception point operation mode, control information on a first set of control resource sets using a first transmission-reception point and control information on a second set of control resource sets using a second transmission-reception point, identify a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode, and transmit, to the UE, an indication for the UE to transition from the multi-transmission-reception point operation mode to the single-transmission-reception point operation mode, and transmit, to the UE, control information on the subset of the first set of control resource sets after the UE transitions to the single-transmission-reception point.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases, the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting CORESET determination for multiple TRP configurations).

The inter-station communications manager 1845 may manage communications with other base station 105 and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
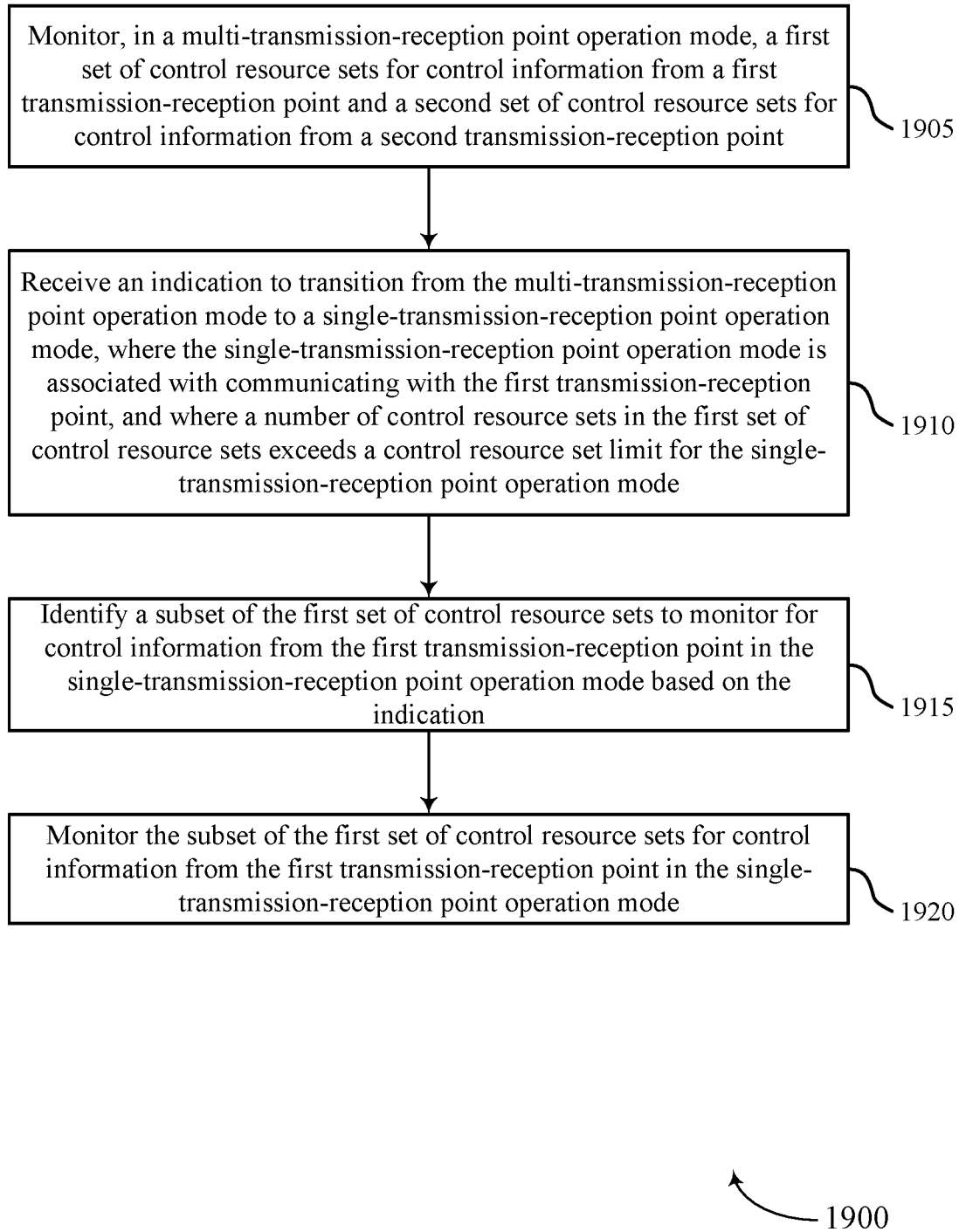
FIGS. 19 and 20 show flowcharts illustrating methods that support CORESET determination for multiple TRP configurations in accordance with aspects of the present disclosure.

FIG. 19 shows a flowchart illustrating a method 1900 that supports CORESET determination for multiple TRP configurations in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1905, the UE may monitor, in a multi-transmission-reception point operation mode, a first set of control resource sets for control information from a first transmission-reception point and a second set of control resource sets for control information from a second transmission-reception point. The operations of 1905 may be performed according to the methods described herein. In some examples, aspects of the operations of 1905 may be performed by a CORESET monitoring manager as described with reference to FIGS. 11 through 14.

At 1910, the UE may receive an indication to transition from the multi-transmission-reception point operation mode to a single-transmission-reception point operation mode, where the single-transmission-reception point operation mode is associated with communicating with the first transmission-reception point, and where a number of control resource sets in the first set of control resource sets exceeds a control resource set limit for the single-transmissionreception point operation mode. The operations of 1910 may be performed according to the methods described herein. In some examples, aspects of the operations of 1910 may be performed by a TRP operation mode manager as described with reference to FIGS. 11 through 14.

At 1915, the UE may identify a subset of the first set of control resource sets to monitor for control information from the first transmission-reception point in the single-transmission-reception point operation mode based on the indication. The operations of 1915 may be performed according to the methods described herein. In some examples, aspects of the operations of 1915 may be performed by a CORESET identifier as described with reference to FIGS. 11 through 14.

At 1920, the UE may monitor the subset of the first set of control resource sets for control information from the first transmission-reception point in the single-transmission-reception point operation mode. The operations of 1920 may be performed according to the methods described herein. In some examples, aspects of the operations of 1920 may be performed by a CORESET monitoring manager as described with reference to FIGS. 11 through 14.

Figure 20:
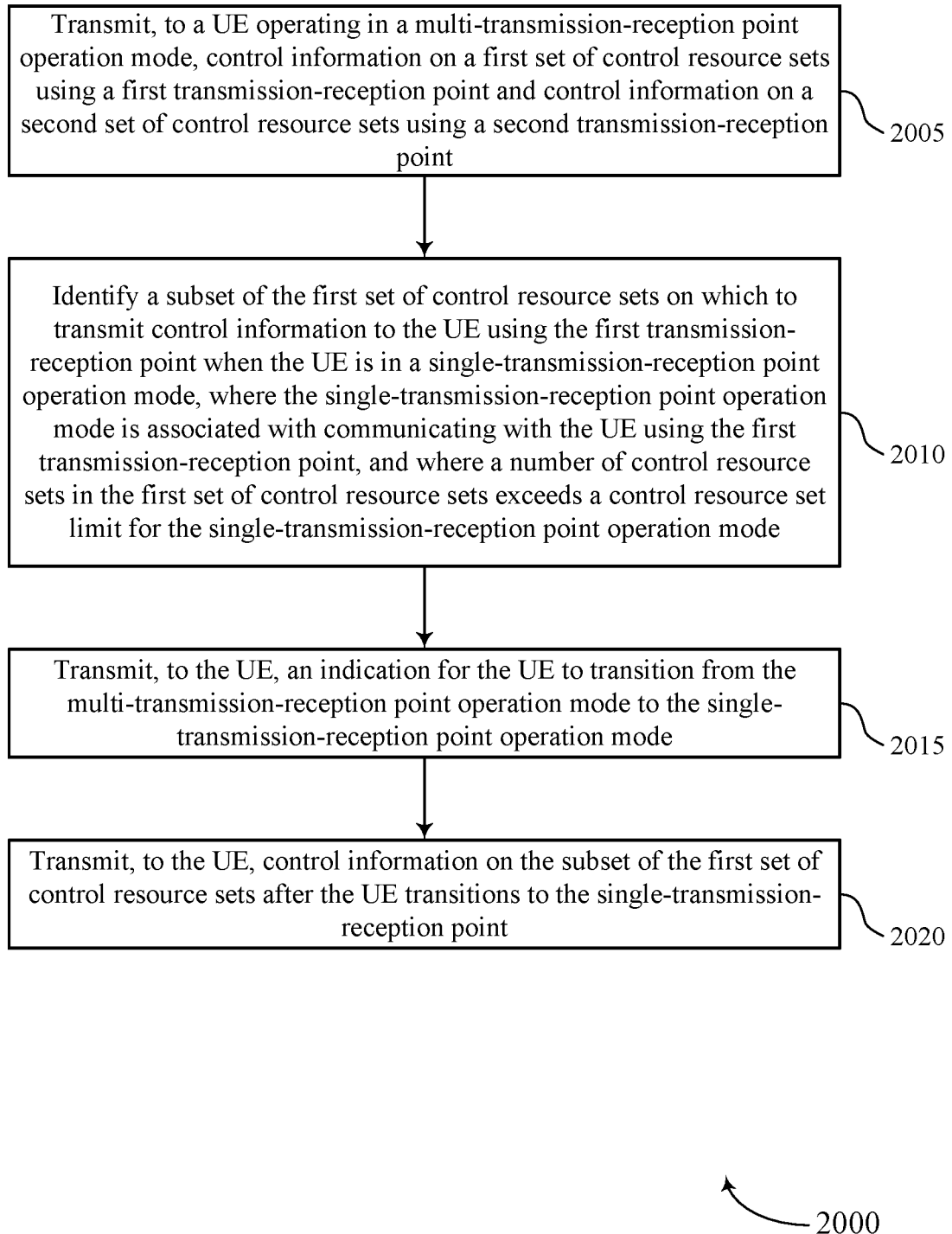

FIG. 20 shows a flowchart illustrating a method 2000 that supports CORESET determination for multiple TRP configurations in accordance with aspects of the present disclosure. The operations of method 2000 may be implemented by a base station 105 or its components as described herein. For example, the operations of method 2000 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2005, the base station may transmit, to a UE operating in a multi-transmission-reception point operation mode, control information on a first set of control resource sets using a first transmission-reception point and control information on a second set of control resource sets using a second transmission-reception point. The operations of 2005 may be performed according to the methods described herein. In some examples, aspects of the operations of 2005 may be performed by a control information manager as described with reference to FIGS. 15 through 18.

At 2010, the base station may identify a subset of the first set of control resource sets on which to transmit control information to the UE using the first transmission-reception point when the UE is in a single-transmission-reception point operation mode, where the single-transmission-reception point operation mode is associated with communicating with the UE using the first transmission-reception point, and where a number of control resource sets in the first set of control resource sets exceeds a control resource set limit for the single-transmission-reception point operation mode. The operations of 2010 may be performed according to the methods described herein. In some examples, aspects of the operations of 2010 may be performed by a CORESET identifier as described with reference to FIGS. 15 through 18.

At 2015, the base station may transmit, to the UE, an indication for the UE to transition from the multi-transmission-reception point operation mode to the single-transmission-reception point operation mode. The operations of 2015 may be performed according to the methods described herein. In some examples, aspects of the operations of 2015 may be performed by a TRP operation mode manager as described with reference to FIGS. 15 through 18.

At 2020, the base station may transmit, to the UE, control information on the subset of the first set of control resource sets after the UE transitions to the single-transmission-reception point. The operations of 2020 may be performed according to the methods described herein. In some examples, aspects of the operations of 2020 may be performed by a control information manager as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
monitoring, in a multi-transmission-reception point operation mode, a first set of control resource sets for control information from a first transmission-reception point and a second set of control resource sets for control information from a second transmission-reception point;

receiving an indication to transition from the multi-transmission-reception point operation mode to a single-transmission-reception point operation mode, wherein the single-transmission-reception point operation mode is associated with communicating with the first transmission-reception point, and wherein a number of control resource sets in the first set of control resource sets exceeds a control resource set limit for the single-transmission-reception point operation mode;
identifying a subset of the first set of control resource sets to monitor for control information from the first transmission-reception point in the single-transmission-reception point operation mode based at least in part on the indication; and
monitoring the subset of the first set of control resource sets for control information from the first transmission-reception point in the single-transmission-reception point operation mode.

2. The method of claim 1, wherein the indication to transition from the multi-transmission-reception point operation mode to the single-transmission-reception point operation mode comprises a first indication, the method further comprising:
receiving a second indication of the subset of the first set of control resource sets; and
identifying the subset of the first set of control resource sets based at least in part on the second indication.

3. The method of claim 2, wherein the first indication and the second indication are received in a radio resource control message.

4. The method of claim 2, wherein the first indication and the second indication are received in a medium access control (MAC) control element (MAC-CE) or a downlink control information (DCI) message.

5. The method of claim 4, wherein the single-transmission-reception point operation mode comprises a temporary single-transmission-reception point operation mode in a radio resource control configured multi-transmission-reception point operation mode.

6. The method of claim 2, wherein receiving the second indication of the subset of the first set of control resource sets comprises:
receiving an indication of control resource sets in the first set of control resource sets excluded from the subset of the first set of control resource sets.

7. The method of claim 6, wherein receiving the indication of control resource sets in the first set of control resource sets excluded from the subset of the first set of control resource sets comprises:
receiving a predefined garbage value in a transmission configuration indication field that corresponds to each control resource set in the first set of control resource sets excluded from the subset of the first set of control resource sets.

8. The method of claim 1, wherein identifying the subset of the first set of control resource sets comprises:
identifying the subset of the first set of control resource sets to monitor for control information from the first transmission-reception point in the single-transmission-reception point operation mode based at least in part on a predefined rule.

9. The method of claim 8, wherein the indication to transition is received from the first transmission-reception point, and wherein identifying and monitoring the subset of the first set of control resource sets comprises:
identifying and monitoring the subset of the first set of control resource sets upon receiving the indication to transition from the multi-transmission-reception point operation mode to the single-transmission-reception point operation mode.

10. The method of claim 8, wherein the indication to transition is received from the second transmission-reception point, and wherein identifying and monitoring the subset of the first set of control resource sets comprises:
identifying and monitoring the subset of the first set of control resource sets upon receiving the indication to transition from the multi-transmission-reception point operation mode to the single-transmission-reception point operation mode; or
identifying and monitoring the subset of the first set of control resource sets once a configured duration of time has expired after receiving the indication to transition from the multi-transmission-reception point operation mode.

11. The method of claim 8, wherein the indication to transition is received from the second transmission-reception point, and wherein identifying and monitoring the subset of the first set of control resource sets comprises:
receiving a triggering signal to trigger the transition from the multi-transmission-reception point operation mode to the single-transmission-reception point operation mode; and
identifying and monitoring the subset of the first set of control resource sets upon receiving the triggering signal.

12. The method of claim 8, wherein the predefined rule indicates that the UE is to select the subset of the first set of control resource sets having a lowest set of indices, and wherein identifying the subset of the first set of control resource sets based at least in part on the predefined rule comprises:
identifying a number of control resource sets corresponding to the control resource set limit for the single-transmission-reception point operation mode;
selecting the number of control resource sets having the lowest set of indices from the first set of control resource sets; and
identifying the subset of the first set of control resource sets based at least in part on the selecting, wherein the subset of the first set of control resource sets includes the number of control resource sets having the lowest set of indices from the first set of control resource sets.

13. The method of claim 1, further comprising:
receiving a second indication to transition back from the single-transmission-reception point operation mode to the multi-transmission-reception point operation mode.

14. The method of claim 13, wherein the indication to transition from the multi-transmission-reception point operation mode to the single-transmission-reception point operation mode comprises a first indication, and the second indication to transition back from the single-transmission-reception point operation mode to the multi-transmission-reception point operation mode comprises a second indication, the method further comprising:
receiving a third indication of the first set of control resource sets to monitor for control information from the first transmission-reception point after transitioning back to the multi-transmission-reception point operation mode.

15. The method of claim 13, further comprising:
identifying the first set of control resource sets to monitor for control information from the first transmission-reception point after transitioning back to the multitransmission-reception point operation mode based at least in part on a predefined rule.

16. A method for wireless communication at a base station, comprising:
transmitting, to a user equipment (UE) operating in a multi-transmission-reception point operation mode, control information on a first set of control resource sets using a first transmission-reception point and control information on a second set of control resource sets using a second transmission-reception point;
identifying a subset of the first set of control resource sets on which to transmit control information to the UE using the first transmission-reception point when the UE is in a single-transmission-reception point operation mode, wherein the single-transmission-reception point operation mode is associated with communicating with the UE using the first transmission-reception point, and wherein a number of control resource sets in the first set of control resource sets exceeds a control resource set limit for the single-transmission-reception point operation mode;
transmitting, to the UE, an indication for the UE to transition from the multi-transmission-reception point operation mode to the single-transmission-reception point operation mode; and
transmitting, to the UE, control information on the subset of the first set of control resource sets after the UE transitions to the single-transmission-reception point operation mode.

17. The method of claim 16, wherein the indication for the UE to transition from the multi-transmission-reception point operation mode to the single-transmission-reception point operation mode comprises a first indication, the method further comprising:
transmitting a second indication of the subset of the first set of control resource sets.

18. The method of claim 17, wherein the first indication and the second indication are transmitted in a radio resource control message.

19. The method of claim 17, wherein the first indication and the second indication are transmitted in a medium access control (MAC) control element (MAC-CE) or a downlink control information (DCI) message.

20. The method of claim 19, wherein the single-transmission-reception point operation mode comprises a temporary single-transmission-reception point operation mode in a radio resource control configured multi-transmission-reception point operation mode.

21. The method of claim 17, wherein transmitting the second indication of the subset of the first set of control resource sets comprises:
transmitting an indication of control resource sets in the first set of control resource sets excluded from the subset of the first set of control resource sets, wherein transmitting the indication further includes transmitting a predefined garbage value in a transmission configuration indication field that corresponds to each control resource set in the first set of control resource sets excluded from the subset of the first set of control resource sets.

22. The method of claim 16, wherein identifying the subset of the first set of control resource sets comprises:
identifying the subset of the first set of control resource sets on which to transmit control information to the UE using the first transmission-reception point when the UE is in the single-transmission-reception point operation mode based at least in part on a predefined rule.

23. The method of claim 22, wherein transmitting the indication for the UE to transition from the multi-transmission-reception point operation mode to the single-transmission-reception point operation mode comprises:
transmitting the indication for the UE to transition from the multi-transmission-reception point operation mode to the single-transmission-reception point operation mode using the first transmission-reception point or the second transmission-reception point.

24. The method of claim 22, further comprising:
transmitting the indication for the UE to transition from the multi-transmission-reception point operation mode to the single-transmission-reception point operation mode using the second transmission-reception point; and
transmitting a triggering signal using the first transmission-reception point to trigger the transition from the multi-transmission-reception point operation mode to the single-transmission-reception point operation mode.

25. The method of claim 22, wherein the predefined rule indicates that the base station is to select the subset of the first set of control resource sets having a lowest set of indices, and wherein identifying the subset of the first set of control resource sets based at least in part on the predefined rule comprises:
identifying a number of control resource sets corresponding to the control resource set limit for the single-transmission-reception point operation mode;
selecting the number of control resource sets having the lowest set of indices from the first set of control resource sets; and
identifying the subset of the first set of control resource sets based at least in part on the selecting, wherein the subset of the first set of control resource sets includes the number of control resource sets having the lowest set of indices from the first set of control resource sets.

26. The method of claim 16, further comprising:
transmitting a second indication for the UE to transition back from the single-transmission-reception point operation mode to the multi-transmission-reception point operation mode.

27. The method of claim 26, wherein the indication to transition from the multi-transmission-reception point operation mode to the single-transmission-reception point operation mode comprises a first indication, and the second indication to transition back from the single-transmission-reception point operation mode to the multi-transmission-reception point operation mode comprises a second indication, the method further comprising:
transmitting a third indication of the first set of control resource sets on which to transmit control information to the UE using the first transmission-reception point after the UE transitions back to the multi-transmission-reception point operation mode.

28. The method of claim 26, further comprising:
identifying the first set of control resource sets on which to transmit control information to the UE using the first transmission-reception point after the UE transitions back to the multi-transmission-reception point operation mode based at least in part on a predefined rule.

29. An apparatus for wireless communication at a user equipment (UE), comprising:
a processor,
memory in electronic communication with the processor; and instructions stored in the memory and executable by the processor to cause the apparatus to:

monitor, in a multi-transmission-reception point operation mode, a first set of control resource sets for control information from a first transmission-reception point and a second set of control resource sets for control information from a second transmission-reception point;

receive an indication to transition from the multi-transmission-reception point operation mode to a single-transmission-reception point operation mode, wherein the single-transmission-reception point operation mode is associated with communicating with the first transmission-reception point, and wherein a number of control resource sets in the first set of control resource sets exceeds a control resource set limit for the single-transmission-reception point operation mode;

identify a subset of the first set of control resource sets to monitor for control information from the first transmission-reception point in the single-transmission-reception point operation mode based at least in part on the indication; and monitor the subset of the first set of control resource sets for control information from the first transmission-reception point in the single-transmission-reception point operation mode.

30. An apparatus for wireless communication at a base station, comprising:

a processor, memory in electronic communication with the processor; and instructions stored in the memory and executable by the processor to cause the apparatus to:

transmit, to a user equipment (UE) operating in a multi-transmission-reception point operation mode, control information on a first set of control resource sets using a first transmission-reception point and control information on a second set of control resource sets using a second transmission-reception point;

identify a subset of the first set of control resource sets on which to transmit control information to the UE using the first transmission-reception point when the UE is in a single-transmission-reception point operation mode, wherein the single-transmission-reception point operation mode is associated with communicating with the UE using the first transmission-reception point, and wherein a number of control resource sets in the first set of control resource sets exceeds a control resource set limit for the single-transmission-reception point operation mode;

transmit, to the UE, an indication for the UE to transition from the multi-transmission-reception point operation mode to the single-transmission-reception point operation mode; and transmit, to the UE, control information on the subset of the first set of control resource sets after the UE transitions to the single-transmission-reception point operation mode.

* * * * *